United States Patent [19]

Noguchi et al.

[11] Patent Number: 6,098,649
[45] Date of Patent: Aug. 8, 2000

[54] WASTE PROCESSING APPARATUS, WASTE RECOVERY SYSTEM AND LIQUID CONTAINER

[75] Inventors: Tsutomu Noguchi, Kanagawa; Minoru Matsushima, Tokyo; Hiraku Sugiki; Yasuhiro Hirafune, both of Saitama, all of Japan

[73] Assignee: Sony Corporation, Tokyo, Japan

[21] Appl. No.: 09/047,271

[22] Filed: Mar. 24, 1998

Related U.S. Application Data

[62] Division of application No. 08/729,382, Oct. 17, 1996, Pat. No. 5,863,002.

[30] Foreign Application Priority Data

| Oct. 24, 1995 | [JP] | Japan | P07-300723 |
| Oct. 24, 1995 | [JP] | Japan | P07-300724 |
| Oct. 24, 1995 | [JP] | Japan | P07-300725 |
| Sep. 13, 1996 | [JP] | Japan | P08-265621 |

[51] Int. Cl.[7] .................................................. B02C 23/36
[52] U.S. Cl. ..................... 137/209; 137/590; 220/23.6; 241/46.17; 241/100
[58] Field of Search ..................... 137/209, 590; 220/23.6; 241/46.17, 100, DIG. 38

[56] References Cited

U.S. PATENT DOCUMENTS

| 718,424 | 1/1903 | Cardella | 137/209 X |
| 798,942 | 9/1905 | Baroch | 137/209 |
| 1,441,171 | 1/1923 | Rice | 137/209 X |
| 1,957,854 | 5/1934 | Smith | 137/209 X |
| 2,173,640 | 9/1939 | West | 137/209 |
| 2,217,582 | 10/1940 | White | 137/590 X |
| 3,369,658 | 2/1968 | Hasselmann | 220/23.6 X |
| 3,784,116 | 1/1974 | Buckman et al. | 241/46.17 |
| 5,354,000 | 10/1994 | Wright et al. | 241/100 X |
| 5,551,641 | 9/1996 | Upton, III et al. | 241/100 X |

*Primary Examiner*—John Rivell
*Attorney, Agent, or Firm*—Hill & Simpson

[57] ABSTRACT

A waste processing apparatus which can easily and efficiently process waste, a waste recovery system using this apparatus and a liquid container ideal for use with the waste processing apparatus and waste recovery system. The waste processing apparatus comprises a processing part for processing supplied waste (for example foam polystyrene) with a processing liquid (for example limonene) and a storing part for storing produced liquid (for example limonene containing dissolved foam polystyrene) produced in this processing part and provided with a removable liquid container constructed to both supply processing liquid to the processing part and receive produced liquid produced by the waste processing apparatus. In the waste recovery system, the liquid container is removed from the waste processing apparatus after receiving the produced liquid and carried to a waste recycling apparatus, the produced liquid is transferred from the liquid container into the waste recycling apparatus, waste or waste and processing liquid is recovered from the produced liquid by the waste recycling apparatus and the empty liquid container is filled with new or recycled processing liquid and returned to the waste processing apparatus again.

24 Claims, 29 Drawing Sheets

FIG. 30A
FIG. 30B
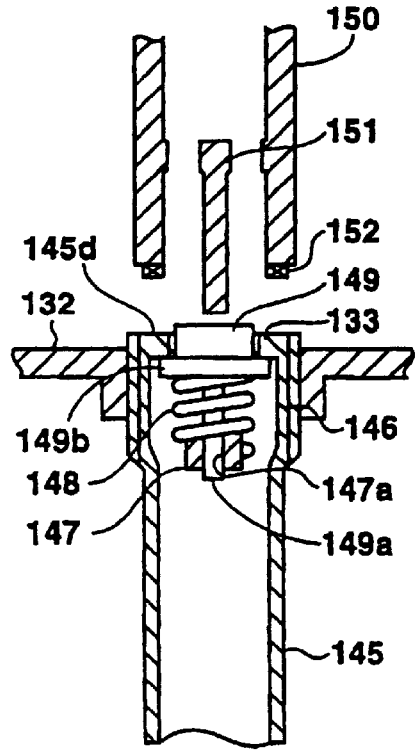
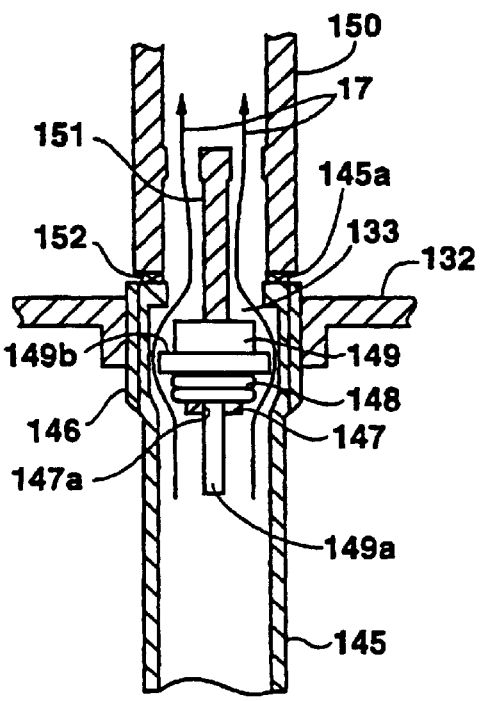
FIG. 31A
FIG. 31B
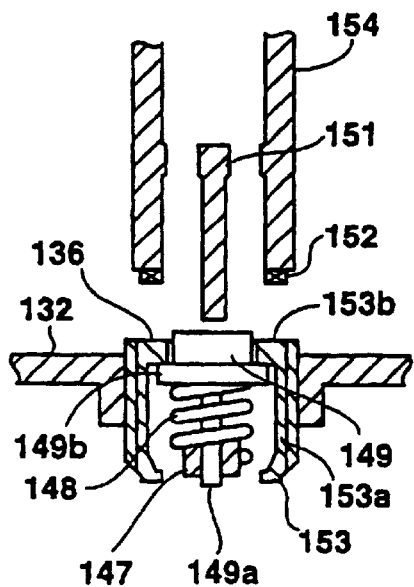
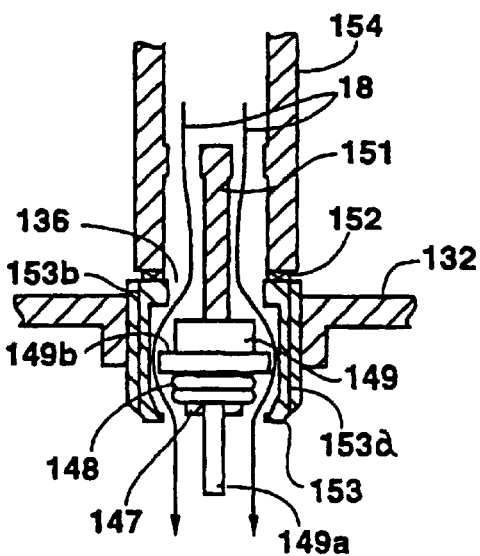

WASTE PROCESSING APPARATUS, WASTE RECOVERY SYSTEM AND LIQUID CONTAINER

This application is a Divisional application of U.S. application Ser. No. 08/729,382, filed Oct. 17, 1996, now U.S. Pat. No. 5,863,002.

BACKGROUND OF THE INVENTION

This invention relates to a waste processing apparatus, a waste recovery system and a liquid container used in these, and particularly to for example an apparatus for dissolving discarded foam polystyrene, a system for recovering discarded foam polystyrene and a container used in these.

Foam polystyrene (so-called foam styrol, or EPS) moldings are used in large quantities in packing of home electrical products and AV (Audio Visual) appliances and the like. Foam polystyrene has merits such as that it has excellent impact absorbency, it can easily be processed into any shape, it is cheap and it has a clean appearance.

However, because on the other hand it has drawbacks such as that when disposed of by incineration it produces high temperature heat and shortens the life of the incinerator and also produces a strong offensive smell and that it does not decompose in soil when buried, with the shift toward environmental protection and resource-saving of recent years the use of foam polystyrene in large quantities has come to be seen as questionable.

In this connection, as a substitute material for foam polystyrene, pulp mold materials manufactured by recycling milk cartons, cardboard boxes and newspaper paper and the like have started to be used to some extent. However, whereas foam polystyrene exhibits excellent impact absorbency due to elasticity of its own, because pulp mold materials derive their shock-absorbing quality from paper being processed into a corrugated shape there is a limit to their strength and buffering performance and dispersion in their characteristics is also large.

Therefore, with respect to general packed products, and particularly large products such as refrigerators, washing machines and televisions, for the time being there is no alternative but to use foam polystyrene as a main packing material. Accordingly, recovering foam polystyrene moldings and recycling them has been being tried.

However, at present the recovery rate of foam polystyrene moldings is extremely low compared to that of paper. The main reason for this is that whereas there are many businesses collecting old paper such as newspapers and magazines and also the price of such paper is stable, foam polystyrene is extremely bulky for its weight, having an apparent specific gravity of about 0.02, and consequently carrying and storing it require a lot of space and it does not meet its recovery cost.

Although equipment for melting foam polystyrene moldings by heating them and making them into blocks has been introduced in some factories and other large facilities, introducing this kind of equipment in a wider field including general points of distribution such as shops and in homes and the like is not easy when cost, installation space and the production of offensive smells which accompanies thermal decomposition of polystyrene are considered. Also, because the molecular weight of the polystyrene molecules in the polystyrene blocks obtained is greatly decreased as a result of thermal decomposition, it is difficult to reuse the polystyrene.

Methods of recycling foam polystyrene moldings by means other than heating have also been used. One such method is that of dissolving foam polystyrene in an organic solvent to shrink its volume and then recovering the foam polystyrene by evaporating the organic solvent. In this method, because thermal processing is not carried out, the molecular weight of the polystyrene molecules is not reduced and the polystyrene can be reused.

In this kind of foam polystyrene processing method, when dissolving the used foam polystyrene in the organic solvent, it is necessary to supply unused organic solvent to the processing apparatus (an apparatus for dissolving the foam polystyrene and thereby reducing its volume) and receive a produced foam polystyrene solution and supply it to a recycling (recovery) system.

However, in the related art, because usually the container for supplying the unused organic solvent and the container for receiving the produced solution have been different dedicated containers and have been differently installed with respect to the processing apparatus, supply and discharge have been carried out with the amounts of liquid supplied and discharged being managed in units of a different fixed quantity in the case of each of these respective containers. Therefore, because it is necessary to carry out fitting and removal of each type of container with respect to the processing apparatus independently and management and carrying of the liquids must also be carried out separately, the ease of operation and the efficiency of the system have been poor and control of the concentration of the produced solution has tended to be inadequate. All the more so because foam polystyrene solution is viscous, not obtaining a solution of a fixed concentration (viscosity) at all times can have an adverse affect on the recycling (recovery) operation.

In the related art, as containers for holding liquids, containers such as the tin can 130A made of tin-plated steel sheet (so-called blik) shown in FIG. 1 and the polypropylene tank 130B shown in FIG. 2 have been widely used. Since these containers each have an opening 131A, 131B (covered by caps 132A, 132B in FIG. 1 and FIG. 2) in one location in the top of the container only, carrying out the above-mentioned dissolving of foam polystyrene moldings out in the way shown in FIG. 3 is conceivable.

FIG. 3 is a schematic sectional view of a foam polystyrene dissolving apparatus 121. A solvent 17 (for example limonene) is supplied to this dissolving apparatus 121 from a container 130 (for example the tin can 130A), and a stirring impeller 133 is disposed so as to be immersed in this solvent. Foam polystyrene moldings are broken up into small pieces 16 in advance and fed into the solvent through an opening 122, and while being stirred together with the solvent by the stirring impeller 133 dissolve in this solvent and become a polystyrene solution 18.

A solution discharge pipe 127 in which a valve 128 is disposed is connected to the bottom of the polystyrene dissolving apparatus 121 facing downward. A part 127a of the solution discharge pipe 127 below the valve 128 bends in two places and is rotatable as shown with the arrows between the position shown with broken lines and the position shown with solid lines. Also, a solvent supply pipe 129 is connected to the top of the polystyrene dissolving apparatus 121, and a pump 172 is disposed in the solvent supply pipe 129. A part 129a below the pump 172 bends in two places and is rotatable as shown with the arrows between the position shown with broken lines and the position shown with solid lines.

The state shown with solid lines in FIG. 3 is the state of the apparatus when polystyrene solution 18 produced in the polystyrene dissolving apparatus 121 is fed into the container 130. The part 127a of the solution discharge pipe 127 below the valve 128 is inserted into the opening 131 in the container 130, the valve 128 is opened and the polystyrene solution 18 is fed into the container 130 from the polystyrene dissolving apparatus 121.

To supply the solvent 17 to the polystyrene dissolving apparatus 121, the part 127a of the solution discharge pipe 127 is removed from the container 130 and positioned as shown with broken lines. Then, with solvent 17 in the container 130, the lower part 129a of the solvent supply pipe is inserted into the container opening 131 as shown with broken lines, the pump 172 is driven and the solvent 17 is transferred from the container 130 into the polystyrene dissolving apparatus.

Because the opening 131 is only provided in one location on the container 130, on every changeover between receiving of polystyrene solution 18 into the container 130 from the polystyrene dissolving apparatus 121 and supplying of solvent 17 from the container 130 into the polystyrene dissolving apparatus 121 it is necessary to interchange the discharge pipe lower part 127a and the solvent supply pipe lower part 129a in the opening 131.

To do this, for example, with the respective pipes in the positions shown with solid lines in FIG. 3 the valve 128 is closed, the container 130 is lowered and the discharge pipe lower part 127a is removed from the opening 131 and rotated to the position shown with broken lines and then the supply pipe lower part 129a is rotated to the position shown with broken lines and inserted into the opening 131 by the container 130 being raised again. Consequently, a large space is required for the pipes. Even when flexible hoses are used instead of the pipes described above, it is necessary to swing the hoses around and a large space is still necessary.

Furthermore, when feeding polystyrene solution 18 whose viscosity has become high from the polystyrene dissolving apparatus 121 into the container 130, because the opening 131 is small it is not possible to make the discharge pipe lower part 127a large in diameter, and the transfer takes time. It is notable in this connection that when d-limonene is used as the solvent, because a polystyrene solution of 30% concentration shows a high viscosity of 10,000 cps, with a small opening 131 it is not possible to transfer the solution into the container 130 smoothly.

For reasons of the kind described above, a container 130 of the related art is not satisfactory for use in processing foam polystyrene waste.

Also, recently, the kind of container shown in FIG. 4 has been developed and has gradually started to spread as a more suitable container, but to discharge a solution 18 held inside the container it is necessary to take off caps of a charging opening 84 and a discharging opening 85 and then tip the container and discharge the solution as shown in the drawing. This is also the same in the cases of the tin can 130A shown in FIG. 1 and the polypropylene tank 130B shown in FIG. 2; the discharging operation requires considerable effort, and particularly in the case of a highly viscous solution, because the discharging takes time, an inordinate amount of exertion is required.

With the container of FIG. 4, as shown in FIG. 5, it is possible to fit a strainer pipe 87 to the discharging opening 85 every time and discharge the solution 18 by sucking it out with a pump 86, but the efficiency of the operation is poor and it is necessary to separately make a strainer pipe which can be fitted to the discharging opening 85.

Although as described above systems for recovering and recycling discarded foam polystyrene moldings have started to operate, consideration has not been given to shapes and standards of containers for holding solutions most suited to liquid transfer and processing apparatuses, and the actual situation is that few proposals for making recycling efficient have been made.

SUMMARY OF THE INVENTION

A first object of this invention is in view of the situation described above to provide a waste processing apparatus which can easily and efficiently process waste (for example discarded foam polystyrene), a waste recovery system using this apparatus and a container for use in these.

A second object of the invention is in view of the situation described above to provide a liquid container ideal for use in a waste processing apparatus and a waste recovery system using this apparatus with which it is possible to easily and efficiently process waste (for example discarded foam polystyrene).

A third object of the invention is to provide a liquid container which is ideal for supplying a solvent to for example a foam polystyrene dissolving apparatus and receiving and carrying a solution and which can also adapt to future automation in this field.

To achieve the above-mentioned objects and other objects, the invention provides a waste processing apparatus having a processing part for processing supplied waste with a processing liquid and a storing part for storing produced liquid produced in this processing part and provided with a removable liquid container for receiving this produced liquid, wherein the liquid container is constructed to receive the processing liquid and supply this processing liquid to the processing part before receiving the produced liquid (hereinafter this will be referred to as the waste processing apparatus of the first aspect of the invention).

The invention also provides a waste recovery system wherein from a waste processing apparatus comprising a processing part for processing supplied waste with a processing liquid and a storing part for storing produced liquid produced in this processing part and provided with a removable liquid container for receiving this produced liquid, the liquid container being constructed to receive the processing liquid and supply this processing liquid to the processing part before receiving the produced liquid, the liquid container holding the produced liquid is removed, this removed liquid container is carried to a waste recycling apparatus, the produced liquid is transferred from the liquid container into this waste recycling apparatus and at least waste is recovered by the waste recycling apparatus, new processing liquid is received into the empty liquid container and the liquid container is returned and attached to the storing part of the waste processing apparatus (hereinafter this will be referred to as the waste recovery system of the second aspect of the invention).

The invention also provides a liquid container used in a waste processing apparatus having a processing part for processing supplied waste with a processing liquid and a storing part for storing produced liquid produced in this processing part, the liquid container being for receiving the produced liquid and removably attachable to the storing part and constructed to receive the processing liquid and supply this processing liquid to the processing part before receiving the produced liquid and carried from the waste processing apparatus to a waste recycling apparatus after receiving the produced liquid and carried from the waste recycling apparatus to the waste processing apparatus after receiving new processing liquid (hereinafter this will be referred to as the liquid container of the third aspect of the invention).

The invention also provides a liquid container used in a waste processing apparatus having a processing part for processing supplied waste with a processing liquid and a storing part for storing produced liquid produced in this processing part, the liquid container being for receiving the produced liquid and removably attachable to the storing part and constructed to receive the processing liquid and supply this processing liquid to the processing part before receiving the produced liquid and carried from the waste processing apparatus to a waste recycling apparatus after receiving the produced liquid and carried from the waste recycling apparatus to the waste processing apparatus after receiving new processing liquid and having at least one first opening for receiving the produced liquid from the processing part after the processing provided in an upper part of a container main body and at least one second opening for discharging liquid provided in a lower part of the container main body, the first opening being wider than the second opening (hereinafter this will be referred to as the liquid container of the fourth aspect of the invention).

Also, the invention provides a liquid container comprising a container main body having a liquid charging opening and a liquid discharging opening and a liquid discharging pipe part provided integrally with the container main body and extending from the discharging opening to the vicinity of an inside bottom surface of the container main body (hereinafter this will be referred to as a liquid container of the fifth aspect of the invention). To eliminate the kinds of problem discussed above, in a liquid container of the fifth aspect of the invention, rationalization is realized by focusing on ease of liquid transfer and carrying and safety and providing a liquid discharging pipe part like a strainer pipe integrally with the container.

In a waste processing apparatus of the first aspect of the invention, preferably, the processing part is constructed as a waste dissolving part for dissolving waste with a solvent as the processing liquid and the storing part stores waste solution produced in the waste dissolving part.

Preferably, the liquid container is fitted on a top part of the waste dissolving part and solvent inside the liquid container is supplied to the waste dissolving part through this top part.

Alternatively, solvent inside a liquid container attached to the storing part can be supplied to the waste dissolving part by pumping means. This applies similarly to the waste recovery system of the second aspect of the invention.

In the waste processing apparatus of the first aspect of the invention, preferably the liquid container has an internal volume corresponding with the amount of waste solution produced in the waste dissolving part and holds solvent at a level below a waste solvent holding level at which it holds waste solvent. This applies similarly to the waste recovery system of the second aspect of the invention.

In the waste processing apparatus of the first aspect of the invention, preferably the waste dissolving part has waste breaking-up means and waste solution holding means and waste and solvent are respectively supplied through a top part. This applies similarly to the waste recovery system of the second aspect of the invention.

In the waste processing apparatus of the first aspect of the invention, preferably detecting means for detecting a change in the level of the liquid surface is provided inside the waste dissolving part. This applies similarly to the waste recovery system of the second aspect of the invention.

A waste processing apparatus based on the invention can be preferably used to dissolve waste consisting of foam polystyrene using at least one solvent chosen from a group consisting of an aromatic organic solvent, a hydrocarbon organic solvent, an ether organic solvent, an ester organic solvent, a ketone organic solvent and a monoterpene organic solvent. This applies similarly to the waste recovery system of the second aspect of the invention and the liquid containers of the third, fourth and fifth aspects of the invention.

As the solvent, preferably at least one of the solvents limonene (particularly d-limonene), isoamyl acetate, benzyl propionate and ethyl butyrate is used. This applies similarly to the waste recovery system of the second aspect of the invention and the liquid containers of the third, fourth and fifth aspects of the invention.

In the waste recovery system of the second aspect of the invention, preferably the processing part is constructed as a waste dissolving part for dissolving waste with a solvent as the processing liquid and the storing part stores waste solution produced in the waste dissolving part.

The solvent can also be recovered by the waste recycling apparatus.

In the waste recovery system of the second aspect of the invention, it is possible to use a waste processing apparatus of any of the various practicing modes described above.

The liquid container of the third aspect of the invention is particularly suitable for use in a waste processing apparatus wherein the processing part is constructed as a waste dissolving part for dissolving waste with a solvent and the storing part stores waste solution produced in the waste dissolving part.

The liquid container is preferably fitted to the storing part after being fitted to the top of the waste dissolving part and supplying solvent to this waste dissolving part.

Alternatively, the liquid container can be constructed so that while it is holding solvent and fitted to the storing part pumping means for transferring the solvent from this storing part to the waste dissolving part is removably attached thereto.

The liquid container of the third aspect of the invention preferably has an internal volume corresponding with the amount of waste solution produced in the waste dissolving part and holds solvent at a level below a waste solvent holding level at which it holds waste solvent.

The liquid container of the fourth aspect of the invention is particularly suitable for use in a waste processing apparatus wherein the processing part is constructed as a waste dissolving part for dissolving waste with a solvent and the storing part stores waste solution produced in the waste dissolving part.

Preferably the liquid container is fitted to the storing part after being fitted to a top part of the waste dissolving part and supplying solvent to this waste dissolving part.

Alternatively, it is also possible to construct the liquid container so that pumping means for transferring the solvent from this storing part to the waste dissolving part can be detachably attached to it while it is holding solvent and fitted to the storing part.

Also, in the fourth aspect of the invention, automatic opening and closing means which opens when pressurized and closes when not pressurized preferably is disposed in the second opening.

Preferably the automatic opening and closing means is a pressure-operated opening and closing valve.

Also, in the fourth aspect of the invention, preferably the liquid container has an internal volume corresponding to the amount of waste solution produced in the waste dissolving part and holds solvent at a level below a waste solvent holding level at which it holds waste solvent.

In the liquid container of the fifth aspect of the invention, the liquid discharging pipe part is preferably integrally formed with the container main body.

Alternatively, the liquid discharging pipe part may be fixed to the container main body by concavity-convexity mating means. In this case, the concavity-convexity mating means is preferably screw-type.

The inside bottom surface of the container main body facing the lower end of the liquid discharging pipe part preferably slopes downward toward the lower end of the liquid discharging pipe part.

Preferably the liquid discharging pipe part extends substantially vertically and is so provided that a liquid discharge pipe can be detachably attached thereto from outside at the liquid discharging opening, and the liquid discharging pipe part has a liquid discharging opening.

Automatic opening and closing means which opens when pressurized and closes when not pressurized may be disposed in the liquid discharging opening, and in this case the automatic opening and closing means preferably is a pressure-operated opening and closing valve.

Preferably a projection part is provided in an upper part of the container main body and a recess part is provided in a corresponding position in a lower part of the container main body and is formed to a shape and dimensions such that it is matable with the projection part, and by this means safety of carrying can be obtained.

A projection part may be provided in one side face of the container and a recess part may be provided in a corresponding position in the other side face of the container and formed to a shape and dimensions such that it is matable with the projection part.

When the construction describe above is adopted it is possible to attach compressed air charging means to the liquid charging opening and liquid inside the container main body can be expelled through the liquid discharge opening by feeding compressed air from this compressed air charging means into the container main body.

The liquid container of the fifth aspect of the invention can be suitably used as a carryable liquid container removably attachable to a processing apparatus and constructed to be carried to the processing apparatus after receiving a processing liquid into the container main body through the liquid charging opening, charge the processing liquid into the processing apparatus and receive produced liquid produced by a predetermined material processing through the liquid charging opening and while holding the produced liquid be removed from the processing apparatus and carried.

This liquid container is preferably used for receiving a solvent as the processing liquid and supplying the solvent to a waste processing apparatus and receiving and carrying a solution produced by dissolving waste with this solvent.

Preferably the waste processing apparatus has waste breaking-up means and a waste dissolving part and the liquid charging opening of the liquid container is connected to this waste dissolving part.

This container is preferably constructed to directly charge processing liquid into the waste dissolving part through the liquid discharging opening.

It can also be so constructed that processing liquid can be directly charged into the waste dissolving part through the liquid discharging opening by pumping means.

A liquid container constructed as described above can be suitably used as a liquid container for carrying a liquid from a processing apparatus to a recycling facility and then carrying a processing liquid back to the processing apparatus.

BRIEF DESCRIPTION OF THE DRAWINGS

FIG. 30A is an enlarged sectional view of the closed state and FIG. 30B an enlarged sectional view of the open state of an automatic valve in a discharging opening of a liquid container according to a further preferred embodiment of the fifth aspect of the invention;

FIG. 31A is an enlarged sectional view of the closed state and FIG. 31B and enlarged sectional view of the open state of an automatic valve in a charging opening of a liquid container according to this preferred embodiment;

DETAILED DESCRIPTION OF THE PREFERRED EMBODIMENTS

The invention will now be described in further detail with reference to preferred embodiments.

FIG. 6 to FIG. 16 show a preferred embodiment of the first through third aspects of the invention applied to the processing of discarded foam polystyrene.

Figure 1:
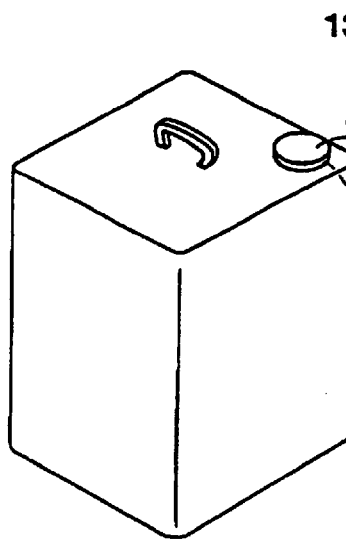
FIG. 1 is a perspective view of a liquid container of the related art.
Figure 2:
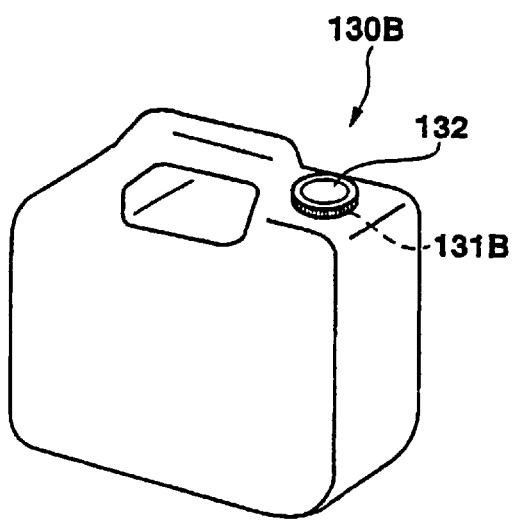
FIG. 2 is a perspective view of another liquid container of the related art.
Figure 3:
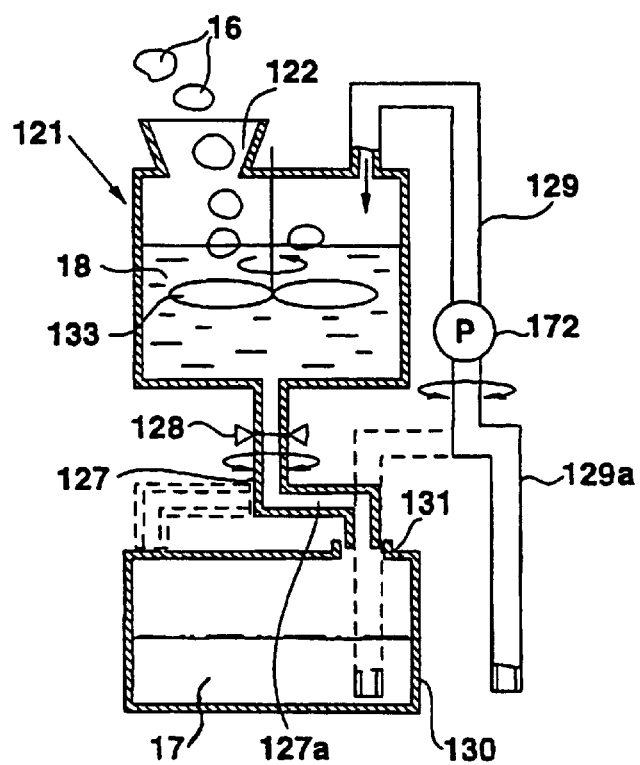
FIG. 3 is a schematic sectional view of a foam polystyrene dissolving apparatus conceived before completion of the present invention.
Figure 4:
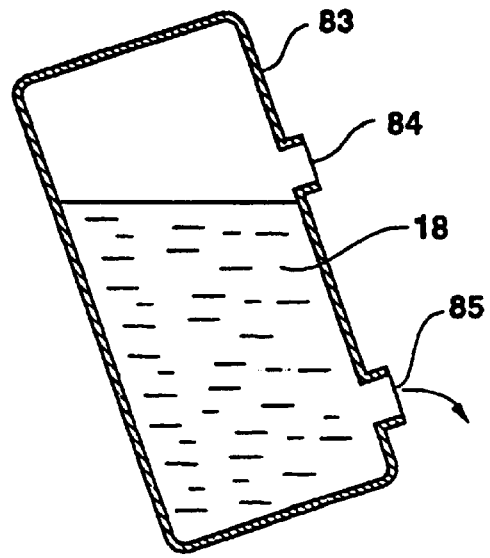
FIG. 4 is a schematic illustration of a related art method for discharging a solution.
Figure 5:
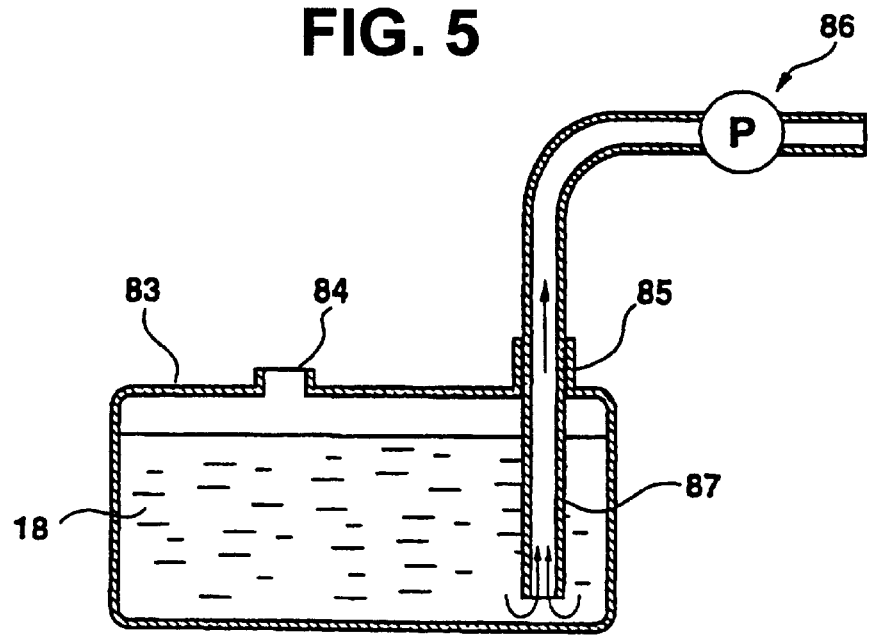
FIG. 5 is a schematic illustration of another related art method for discharging a solution.
Figure 6:
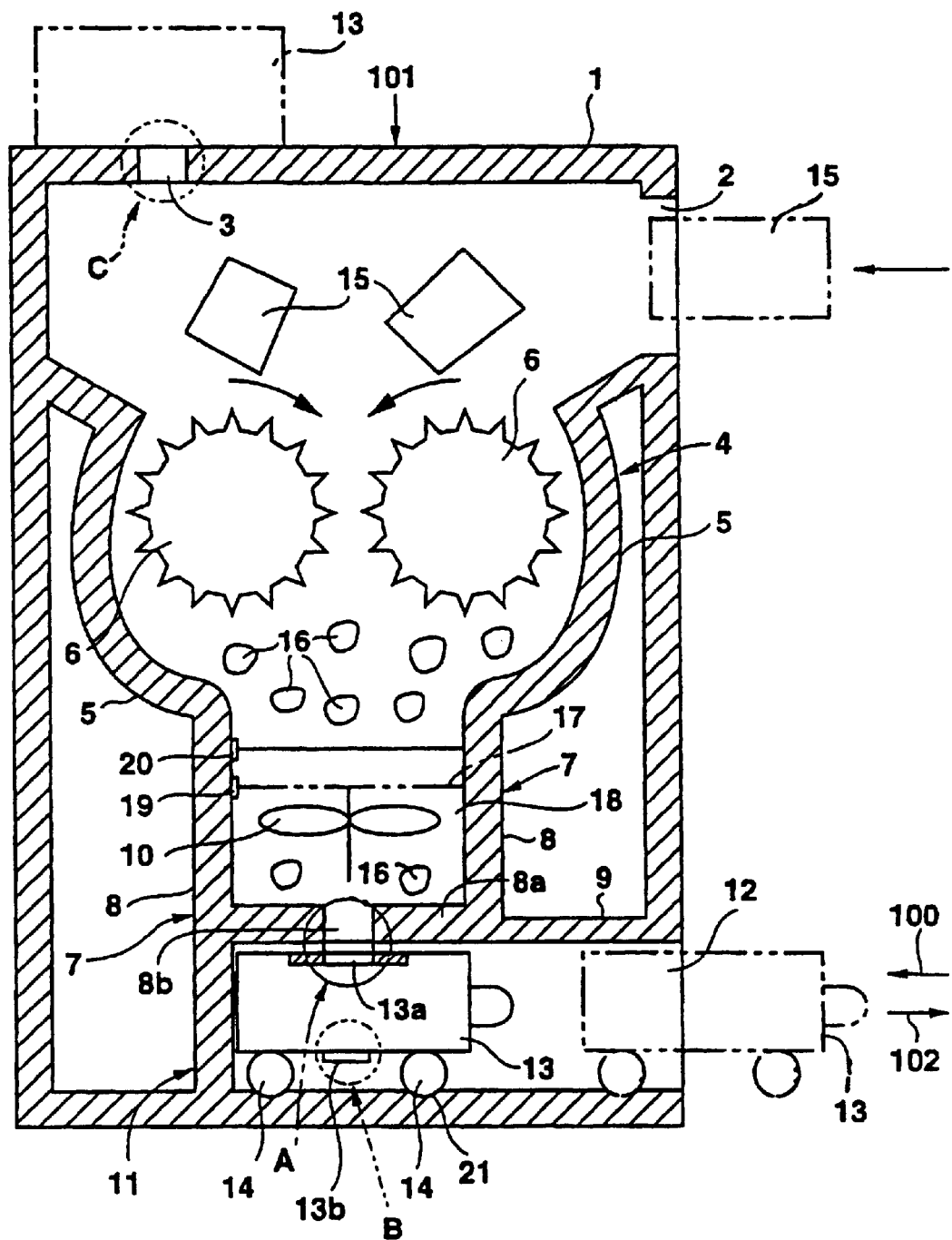
FIG. 6 is a sectional view of a foam polystyrene dissolving apparatus according to a preferred embodiment of the first through third aspects of the invention.

FIG. 6 is a schematic construction view of a foam polystyrene dissolving apparatus (volume-reducing apparatus) 101 according to the invention.

This apparatus has such a size and shape that it can be installed in a shop or the like for the purpose of dissolving foam polystyrene, and in a top part of a housing 1 an opening 2 for feeding in foam polystyrene and a solvent supplying part 3 for fitting a container to and supplying solvent through are provided, and on the lower side of these a side wall 5 of a foam polystyrene breaking-up and dissolving part 4 is provided. A lower side part 8 of the side wall 5 extends vertically downward and is constricted so that its cross-sectional area is narrower than the side wall 5, forming a dissolving area 7, and a central part of the bottom wall 8a connected to the side wall lower side part 8 forms a solution outlet opening 8b.

A pair of breaking-up wheels 6, 6 are disposed in the upper part of the inside of the side wall 5 of the dissolving part 4, and are mutually oppositely rotated in the directions of the arrows by driving means not shown in the drawings. Also, a stirring impeller 10 is disposed inside the dissolving area 7 and is rotated by driving means not shown in the drawings.

As the solvent d-limonene is used, and this solvent is fed under its own weight into the dissolving area 7 from above from a liquid container 13 (shown with broken lines) fitted to the supply part 3.

A for example optical sensor 19 for detecting that a predetermined quantity of solvent 7 has been supplied is disposed on the inner side of one side wall of the lower side part 8 of this dissolving area 7. Below the bottom wall 8a constituting the lower side of the dissolving area 7 the container 13 having become empty after the above-mentioned solvent supplying operation is attached to the solution outlet opening 8b and a storing part 11 for storing a solution of foam polystyrene is thereby formed. The above-mentioned bottom wall 8a is fixed to one side wall of the housing 1 by a bottom plate 9.

Next, dissolving processing of discarded foam polystyrene will be described.

In the solvent supply part 3, from the container 13 a predetermined amount of solvent 17 is supplied to the dissolving area 7 up to the level shown with a broken line, and when the sensor 19 detects this the breaking-up wheels 6, 6 rotate. Foam polystyrene moldings 15 to be discarded are fed into the dissolving part 4 through the opening 2, are broken up by the breaking-up wheels 6, 6 and become foam polystyrene small pieces 16.

These small pieces 16 fall into the solvent 17 in the dissolving area 7 and while being stirred by the stirring impeller 10 dissolve in the solvent 17 and become a solution 18. To accelerate this dissolving, the stirring impeller 10 rotates and stirs the solution and the small pieces 16. Because the solvent 17 dissolves the foam polystyrene, the liquid quantity in the dissolving area 7 increases to the level shown with a solid line.

As a result of them being dissolved, the volume of the foam polystyrene moldings 15 greatly decreases (for example to 1/10 to 1/25 of its original volume).

The liquid surface of the solution 18 having dissolved a predetermined amount of foam polystyrene is detected by a for example optical sensor 20 positioned above the sensor 19 and the supply of foam polystyrene is stopped so that the liquid surface does not rise further than this. This can be displayed to a user by a display lamp or the like on this processing apparatus. The sensor 20 is disposed at a liquid surface level such that the polystyrene concentration of the solution 18 reaches 30% (when d-limonene is used as the solvent, equivalent to 10,000 cps in viscosity) and the volume of the solution 18 is 7 to 20 l.

In this way it is possible to reliably produce a solution of a fixed viscosity and a fixed quantity at all times with one dissolving process, and this is advantageous to a recycling process which will be discussed later.

d-limonene is contained in the skin of citrus fruits and is used in food additives as a fragrance agent; it is safe, is boiling point is 176° C. and its flammability is also low. Moreover, is has the property of dissolving polystyrene well at room temperature and therefore is ideal as the solvent in this example.

After supplying the solvent in the solvent supply part 3, the container 13 becomes empty, and this empty container 13 is then inserted from the position shown with broken lines through an exit/entrance opening 12 to the position shown with solid lines (a position in the storing part 11 below the dissolving area 7) in the direction of the arrow 100. This is easy because casters 14 are provided on the bottom of the container 13 and concave parts for positioning 21 are provided on the apparatus side.

Then, a valve which will be discussed later opens and the solution 18 is received into the container 13 from the dissolving area 7 via a supply hole 13a in the container 13. Also, a discharge hole 13b for supplying solution to a polystyrene recycling apparatus which will be discussed later is provided in the container 13.

Figure 7A:
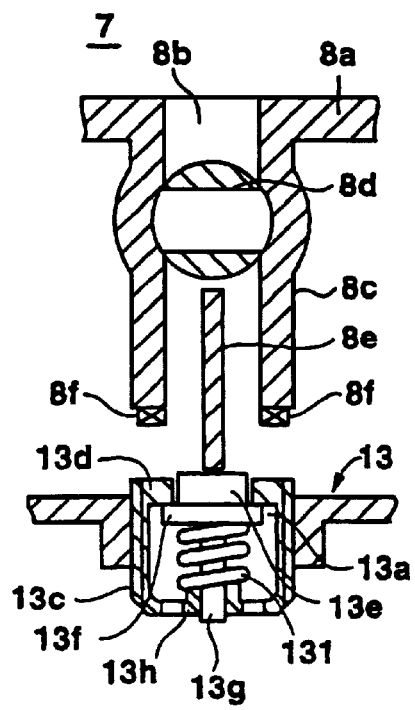
FIGS. 7A, 7B and 7C are enlarged sectional views of a part A of the apparatus shown in FIG. 6.
Figure 7B:
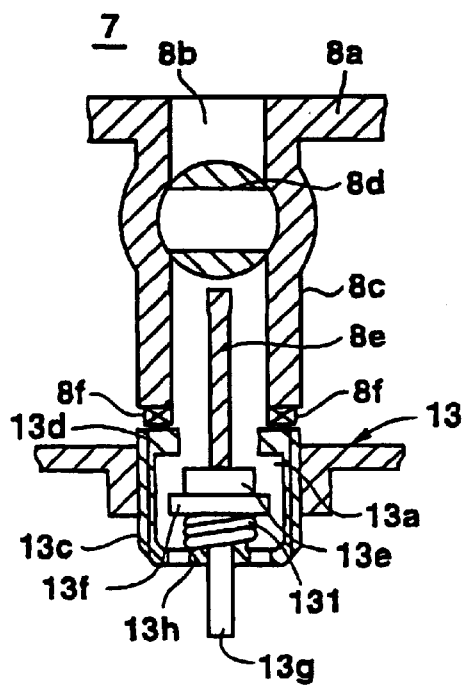
Figure 7C:
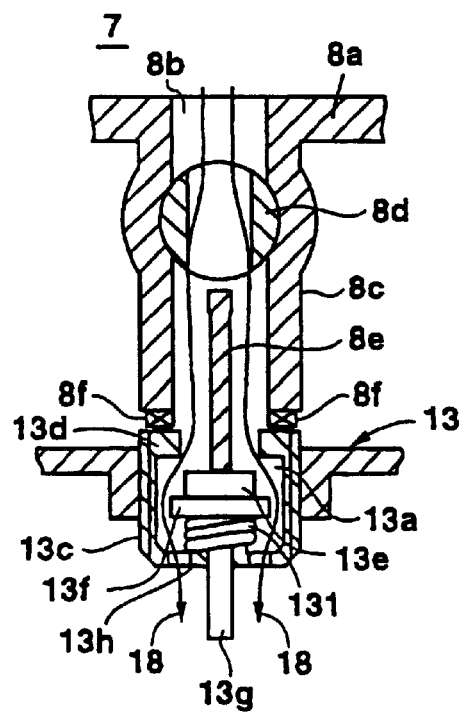

FIGS. 7A, 7B and 7C are enlarged sectional views showing the above-mentioned supply hole 13a and the aforementioned valve. A tubular part 8c is connected to the bottom wall 8a of the dissolving area 7 so as to connect with the solution outlet opening 8b, a valve 8d is provided in the tubular part 8c and a seal member 8f is attached to the end of the tubular part 8c.

FIG. 7A shows the state of the valve immediately before the container 13 is attached to the dissolving area 7, and the valve 8d is closed. A tubular part 13c for forming a solution inlet opening 13a is attached to the container 13. Opening and closing of the solution inlet opening 13 is carried out by vertical direction movement of a movable member 13e. A large-diameter part 13f is fixed to the movable member 13e, and a shaft 13g fixed to the large-diameter part 13f is urged upward by a coil spring 13i and the large-diameter part 13f abuts with an inward-facing flange 13d of the tubular part 13c and closes the solution inlet opening 13a. The coil spring 13i fits slidably on the outside of the shaft 13g and abuts with a guide ring 13h fixed to the end of the tubular part 13c.

FIG. 7B shows the state of the valve when the container 13 is attached to the dissolving area 7. In this state, the tubular parts 8c, 13c are sealed by the seal member 8f. A push pin 8e fixed to the dissolving area 7 pushes the movable member 13e downward and against the urging force of the coil spring 13i the large-diameter part 13f moves away from the inward-facing flange 13d of the tubular part 13c and opens the solution inlet opening 13a. However, in this state, the valve 8d is closed and the solution is not fed into the container. While this state is maintained, dissolving of polystyrene small pieces in the solvent proceeds.

When this dissolving is finished, as shown in FIG. 7C, the valve 8d is opened and polystyrene solution 18 in the dissolving area is fed into the container 13 as shown by the arrows.

Figure 8:
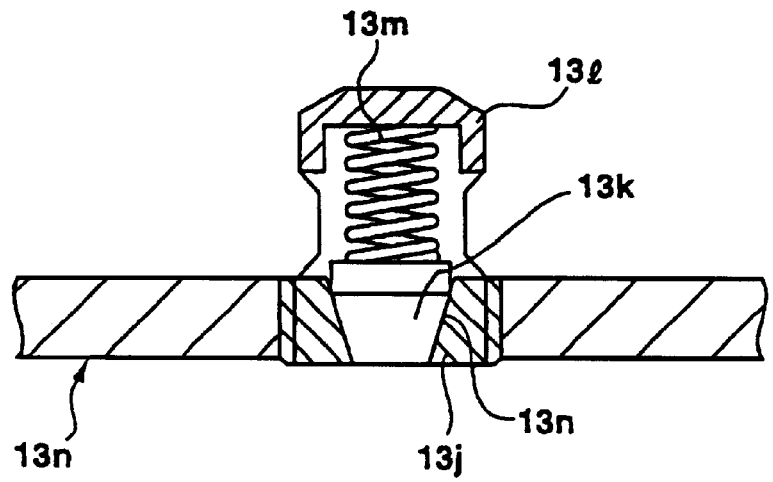
FIG. 8 is an enlarged sectional view of the part B of the apparatus.

FIG. 8 is an enlarged sectional view showing the discharge hole 13b of the container 13. A valve seat 13j provided with a through hole 13n having a tapered inner peripheral surface and forming the solution discharge hole 13b (see FIG. 9) is screwed into the bottom wall of the container 13. A poppet valve member 13k having a tapered outer peripheral surface matching the tapered inner peripheral surface of the through hole 13n fits in the through hole 13n. The poppet valve member 13k is urged downward by a cap part 131 fixed to the valve seat 13j and a coil spring 13m disposed inside this and closes the through hole 13n.

Figure 9:
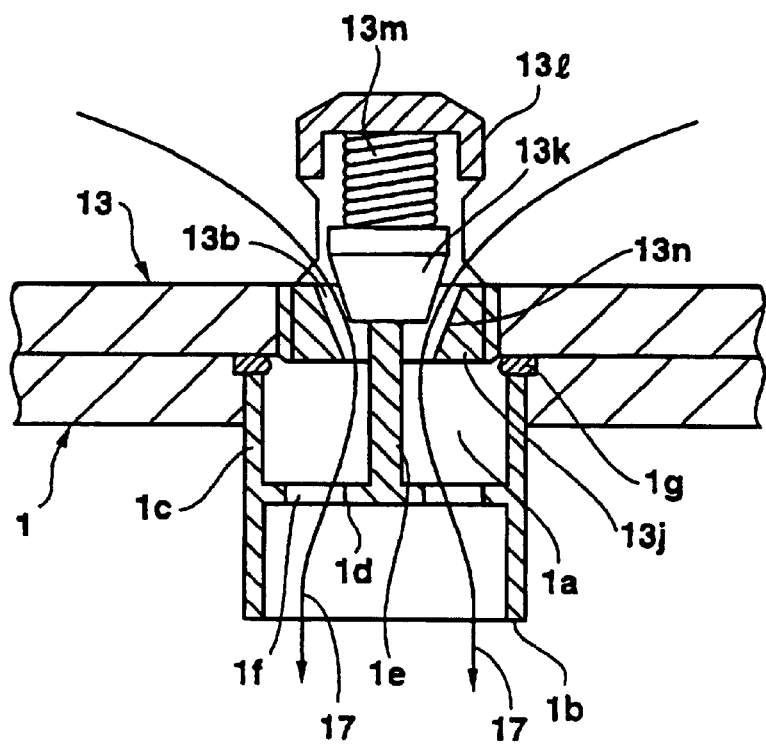
FIG. 9 is an enlarged sectional view of the part C of the apparatus.

FIG. 9 is an enlarged sectional view showing the solvent supply part 3 of FIG. 6. A push mechanism 1b is disposed in contact with a solvent supply opening 1a provided in the upper wall of the housing 1. The push mechanism 1b is integrally made up of a tubular part 1c, a push pin support plate 1d provided with an annular through hole 1f, and a push pin 1e. An annular seal member 1g is fixed to the upper end of the tubular part 1c.

The solvent supply part 3 is normally in the state in which it is shown in FIG. 8. When the container 13 is set on the upper wall of the housing 1 as shown in FIG. 9, the push pin 1e abuts with the poppet valve member 13k and against the urging force of the coil spring 13m the poppet valve member 13k rises and moves away from the valve seat 13j, and as a result the through hole 13n opens and the solvent 17 passes through the solvent supply hole 13b and is supplied from the container 13 into the housing 1 as shown by the arrows.

Also in the case of supplying polystyrene solution inside the container 13 into a waste recycling apparatus which will be discussed later, it is possible to use the same mechanism as that of FIG. 9.

Figure 10:
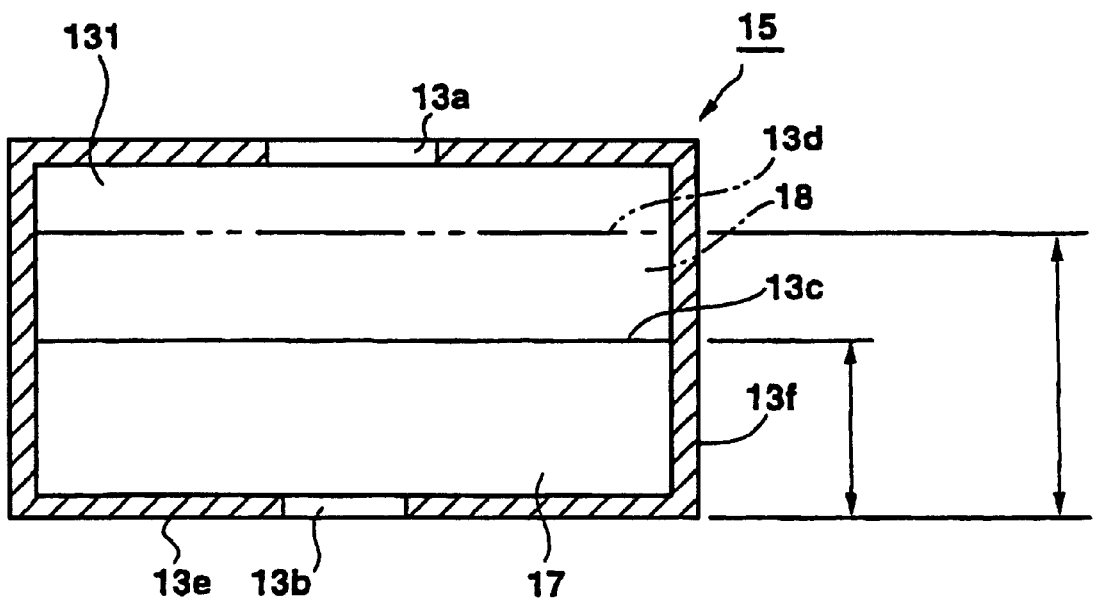
FIG. 10 is a sectional view of a liquid container used in the apparatus.

FIG. 10 is a schematic sectional view of the container 13 when holding solvent and used with the dissolving apparatus described above. The solvent 17 is held up to the level 13c shown with a solid line. In the way described above, foam polystyrene is dissolved in the solvent and the solution 18 produced has a larger volume and is received up to the level 13d shown with a broken line. Inside the container 13 a space 131 is formed above the solution 18 and safety standards are thereby satisfied.

Therefore, the container. 13 having received the solution 18, after having been removed from the dissolving apparatus 101 in the direction of the arrow 102 in FIG. 6, can be carried safely to a foam polystyrene recycling apparatus which will be discussed later. Since all that is necessary is to attach and detach the container 13 with respect to the dissolving apparatus 101 in this way when supplying solvent thereto and after receiving solution therefrom, the respective operations are easy. Preferably the container 13 is made of semi-transparent plastic and marks are provided in the two above-mentioned liquid surface positions.

The internal volume of the container 13 is normally 5 to 30l according to the capacity of the foam polystyrene dissolving apparatus 101, but it is preferably chosen within the range 10 to 26l and 15 to 20l is ideal. The amount of solvent held is preferably made in the range 7 to 20l to match this. Because 20l (about 16 Kg) is the limit for a person to carry alone, a container 13 holding polystyrene solution of concentration 30% preferably is made of internal capacity 20l or less. The volume ratio of the solvent 17 and the solution 18 is about 1:1.5, and if the capacity of one processing in the dissolving apparatus 101 is set at the maximum amount of solution that a person can carry alone safely and without excessive effort and the container 13 is made a dual-purpose container used for both solvent holding and solution holding designed to a size corresponding to that, valuable benefits are obtained (this will be discussed later).

The foam polystyrene dissolving apparatus 101 of FIG. 6 is installed in shops such as electrical appliance shops, department stores and supermarkets, and here as mentioned above foam polystyrene moldings are dissolved using solvent supplied by the container 13 and the same container 13 receives the produced solution 18 and is carried to a polystyrene recycling apparatus. One polystyrene recycling apparatus can be provided with respect to a plurality of or numerous foam polystyrene dissolving apparatuses of the kind shown in FIG. 6.

Figure 11:
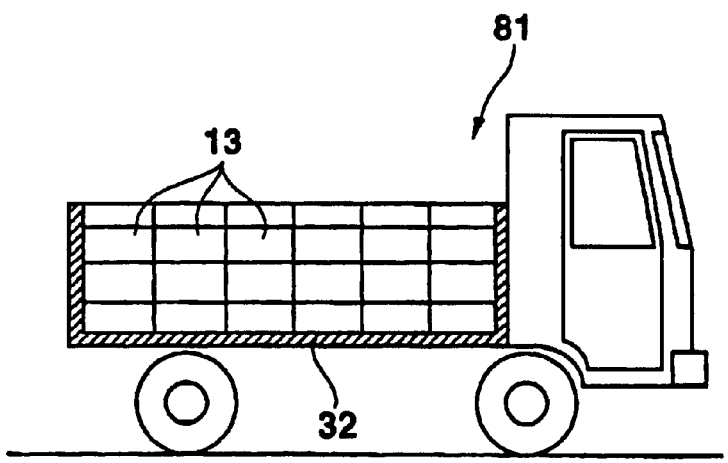
FIG. 11 is a side view of a truck for transporting the container.

FIG. 11 is a side view of a truck for simultaneously carrying numerous containers 13 holding solution from the foam polystyrene dissolving apparatus 101 of FIG. 6 to a polystyrene recycling apparatus. The containers 13 are loaded onto a load-carrying platform 32 of the truck 31 in orderly rows.

Then, as will be discussed later, in the polystyrene recycling apparatus, because not only polystyrene but also solvent is extracted from the solution and recycled, it is possible to receive this recycled new solvent into containers 13 and carry and distribute these to foam polystyrene dissolving apparatuses 101 in the same way as shown in FIG. 11.

Figure 12:
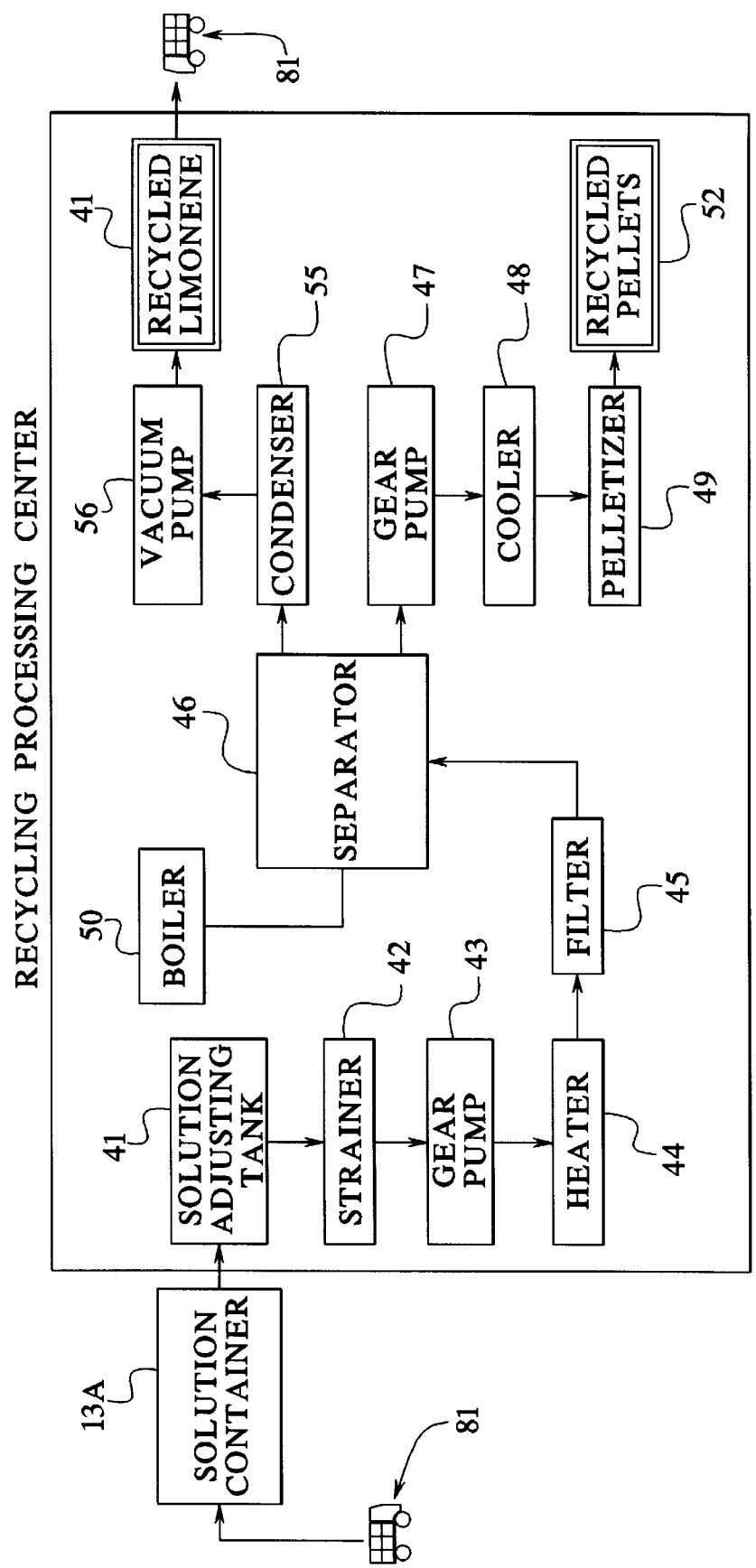
FIG. 12 is a flow chart of a system for recycling solution held in the container.

FIG. 12 is a process flow chart showing a treatment process in the polystyrene recycling apparatus.

From a container 13 holding a fixed quantity of polystyrene solution up to the liquid surface level 13d of FIG. 10 polystyrene solution 18 is supplied from a solution container 13A to a solution adjusting tank 41 and becomes a uniform composition.

This uniform polystyrene solution is passed by a gear pump 43 through a strainer 42 having the function of a coarse filter and is warmed up in a heater 44 and its viscosity decreases.

Next, the polystyrene solution is fed into a filter 45 and filtered, and in a separator 46 is separated into polystyrene and solvent. In this separator 46, it may be heated with steam from a boiler 50.

This separated polystyrene is passed through a cooler 48 by means of a gear pump 47 and cooled, made into recycled pellets 52 by a pelletizer 49 and then carried to another factory where it is recycled as polystyrene moldings or polystyrene containers or the like.

Meanwhile, the solvent vapor separated by the separator 46 is liquefied in a condenser 55 using a vacuum pump 56 and is recovered as recycled solvent (for example recycled limonene) 17.

The solvent 17 in a solvent tank 57 is transferred into containers 13 having discharged polystyrene solution into the dissolving liquid adjusting tank 41 as described above and become empty, and can be distributed by a truck 31 as shown in FIG. 11 to foam polystyrene dissolving apparatuses 101 of the kind shown in FIG. 6 and be used again for dissolving foam polystyrene. At this time, the solvent 17 is filled into the containers 13 up to the liquid surface level 13c shown in FIG. 10.

d-limonene dissolves polystyrene at room temperature and also has an oxidation decomposition suppressing action of not allowing polystyrene to be decomposed even by heating of about 225° C. Therefore, in FIG. 12, the polystyrene does not decompose at all in the heating by the heater 41 or the heating by the separator 46, and can be recycled as polystyrene with its high molecular weight unchanged.

The container 13, as described above, can be circulated by being repeatedly carried from the foam polystyrene dissolving apparatus 101 of FIG. 6 to the polystyrene (and solvent) recycling apparatus of FIG. 12 and then back to the foam polystyrene dissolving apparatus 101 of FIG. 6.

Figure 13A:
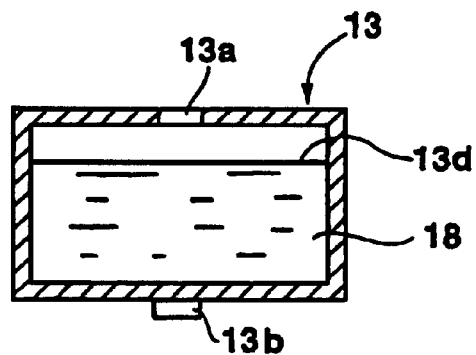
FIGS. 13A, 13B and 13C are sectional views showing quantities in which liquids are held in the container.
Figure 13B:
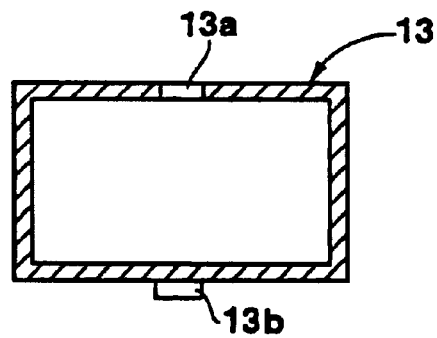
Figure 13C:
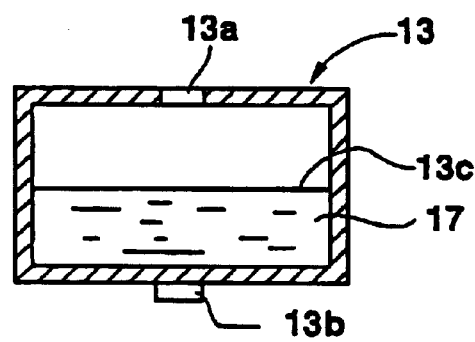

During this time the container 13 goes through three different states, namely the state shown in FIG. 13A of holding the polystyrene solution 18, the empty state of FIG. 13B and the state shown in FIG. 13C of holding the solvent 17. Also, in the foam polystyrene dissolving apparatus 101 of FIG. 6, the container 13 goes through three different states, namely the state shown in FIG. 13C of holding the solvent 17, the state shown in FIG. 13B of having supplied the solvent 17 to the foam polystyrene dissolving part 4 and become empty, and the state shown in FIG. 13A of having received the polystyrene solution 18 in the storing part 11.

Because in this way the same container 13 is carried between the foam polystyrene dissolving apparatus 101 of FIG. 6 and the polystyrene (and solvent) recycling apparatus of FIG. 12 while repeating the three states shown in FIGS. 13A, 13B and 13C and in the foam polystyrene dissolving apparatus 101 of FIG. 6 is used for the dissolving of foam polystyrene repeating the three states FIG. 13A, 13B and 13C, dissolving of foam polystyrene and recycling of polystyrene and solvent can be carried out as necessary conveniently and continuously, and these dissolving and recycling processes are executed efficiently.

The above-mentioned difference in volume between the solvent 17 and the solution 18 is 1:1.5, but it is possible to design with the capacity of one processing of the dissolving (volume reducing) apparatus 101 as a maximum value and make a common container 13 a dedicated container also of that capacity and make the transportation container for the unused solvent and the transportation container for the solution common. The liquid transportation container 13 is fitted to the inside of the dissolving (volume reducing) apparatus 101 and liquid removal and charging can be carried out easily.

Being able to discharge solution whose concentration is held fixed makes processing at a recycling plant easy, and in this system this is achieved by the solvent being supplied to the waste processing apparatus in a dedicated container in a fixed amount predetermined to produce foam polystyrene solution of an optimum concentration in an amount such that it can be carried to the recycling plant in the same dedicated container. That is, concentration control is carried out simply by filling the liquid container with solvent to the level 13c shown in FIG. 10 and stopping the addition of foam polystyrene and discharging the foam polystyrene solution from the waste processing apparatus when the surface of the solution in the waste processing apparatus reaches the level of the sensor 20.

Thus, in a foam styrol dissolving and recycling system using a solvent according to the invention, the following valuable benefits can be obtained:

(1) Transfer of solution and solvent in the dissolving apparatus is easy. This is more marked when the container is installed outside the apparatus.

(2) Transport systems of both new and old liquids can be operated using a single container.

(3) Compatibility of apparatuses and containers designed with the same specifications can be provided.

(4) The safety of operation of the system increases.

(5) It is possible to provide a dissolving apparatus which can be easily installed and used even in a shop or a home.

Next, for the case of d-limonene, an experiment investigating the relationship between the amount of solvent used and the resulting change in the volume of a foam polystyrene molding will be described. This experiment was carried out by spraying d-limonene at a foam polystyrene block in a polyethylene bag. The specific gravity of the foam polystyrene block used here was 0.02 (foaming to 50 times unfoamed volume).

Figure 14:
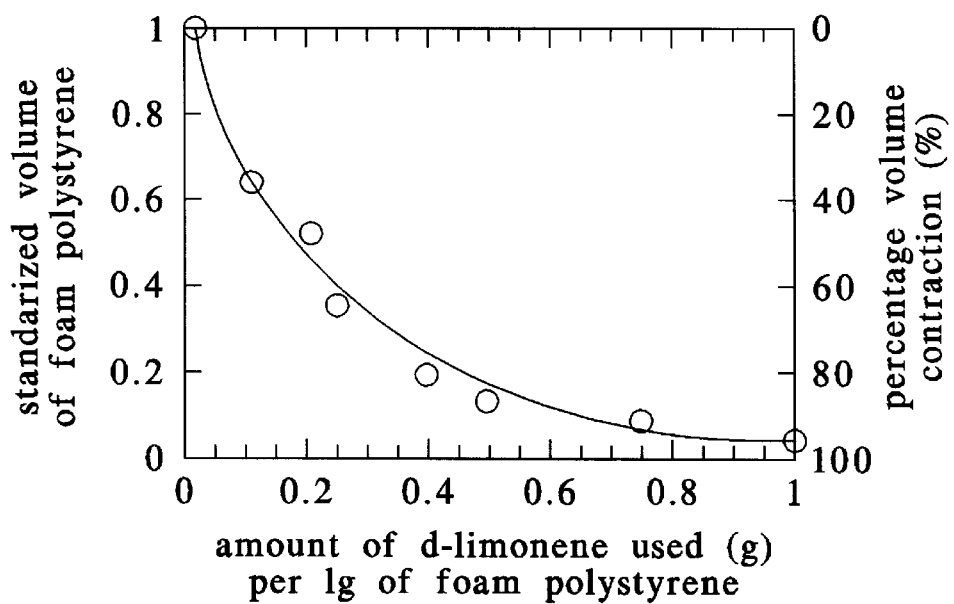
FIG. 14 is a graph showing change in volume of foam polystyrene vs. amount of limonene used to shrink it.

The results are shown in FIG. 14. In the figure, the horizontal axis shows the amount of d-limonene used (g) per 1 g of foam polystyrene, and the vertical axis shows standardized volume (relative volume) of the foam polystyrene after contraction when the volume before contraction is taken as 1, and percentage volume contraction. From this figure it was found that if 0.75 kg of d-limonene is sprayed at 1 kg of foam polystyrene (volume about 50 l) it is possible to contract the volume to about 5 l, or ¹/₁₀, and to about 2 l, or ¹/₂₅, if 1 kg of d-limonene is used.

Next, an experiment investigating the characteristics of polystyrene recycled from polystyrene solution made by dissolving foam polystyrene with d-limonene as a solvent will be described. In this experiment, by gel osmosis chromatography, molecular weight measurement was carried out to determine molecular weight change, which greatly influences the properties of polystyrene.

Polystyrene solution was heated in an atmosphere cut off from oxygen and the d-limonene was thereby removed. The heating at this time was carried out for 10 minutes at each of the temperatures 180° C., 200° C. and 250° C. For comparison, a sample from which the d-limonene was removed by pressure reduction without carrying out heating was also prepared.

Figure 15:
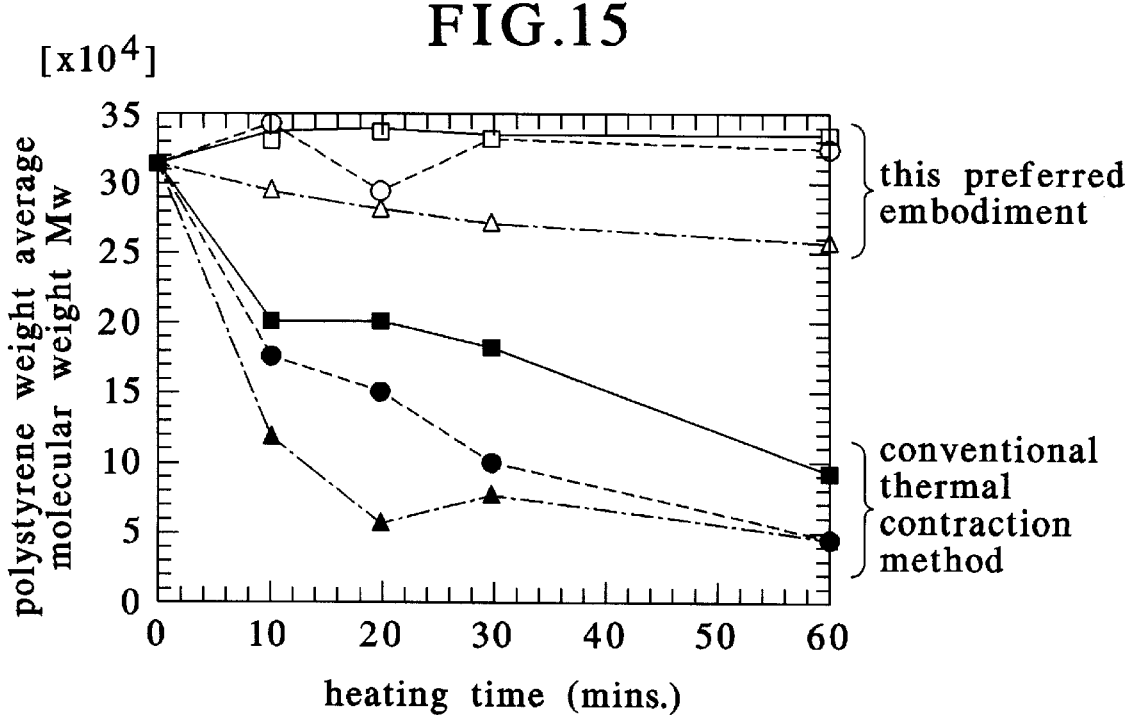
FIG. 15 is a graph showing change with heating time in the molecular weight of foam polystyrene processed with limonene compared with that of foam polystyrene processed by thermal contraction.

The results of this gel osmosis chromatography are shown in FIG. 15. In the figure, the vertical axis shows weight average molecular weight Mw of the polystyrene and the horizontal axis shows heating time (minutes). The white colored plots show data of polystyrene recovered with this preferred embodiment and the black colored plots show data of polystyrene recovered by conventional thermal contraction; the square plots (□, ■) show the case of heating temperature 180° C., the circular plots (0, ●) the case of heating temperature 200° C. and the triangular plots (Δ,▲) the case of heating temperature 225° C.

The weight average molecular weight Mw of the polystyrene sample of which heating was not carried out (heating time zero) is 31.6×10⁴. With the polystyrenes recovered by thermal contraction, the weight average molecular weight Mw decreased markedly with heating time and with rise in heating temperature. In contrast with this, with the polystyrene recovered with this preferred embodiment, this kind of phenomenon was not seen. Particularly, with heating at 180° C. and 200° C., rather there are regions where a tendency for the molecular weight to increase is seen, and it was found that d-limonene itself has an effect of suppressing oxidation decomposition of polystyrene.

Thus, recovery using d-limonene is extremely advantageous from the point of view of reuse of the polystyrene also.

Next, an experiment wherein the above-mentioned d-limonene and besides that isoamyl acetate, benzyl propionate and ethyl butyrate were used as solvents will be described.

Limonene is a monoterpene hydrocarbon existing widely in the plant world, and a d type, a l type, a dl type are known. In particular the d type is a colorless liquid of boiling point 176° C. having a pleasant smell like orange, and is approved as a food additive and widely used as a raw material of perfume.

The above-mentioned solvents other than limonene also are synthetic ester compounds used as food additives. Isoamyl acetate is used as an aroma component of banana, apple, pear and the like and is a colorless liquid of boiling point 141° C. Benzyl propionate is a colorless liquid of boiling point 222° C. having a smell like jasmine. Ethyl butyrate is a colorless liquid of boiling point 120° C. having a smell like fruit and jasmine.

The same experiment as that described above was carried out. That is, a foam polystyrene block of volume 50 cc was put into a polyethylene bag and the mouth of the bag was tightened and the inside was thereby sealed. The weight of the foam polystyrene block was 1g, and its specific gravity was 0.02 (foaming to 50 times unfoamed volume). Here, the needle of a syringe filled with solvent was inserted into the mouth of the polystyrene bag and while suitably changing the orientation of the polystyrene block 1 ml of solvent was sprayed in stages. The volume of the foam polystyrene block after spraying and the percentage volume contraction are summarized in Table 1 below.

TABLE 1

| composition of foam polystyrene contracting agent | volume of foam polystyrene block after spraying (ml) | percentage volume contraction (%) |
|---|---|---|
| d-limonene 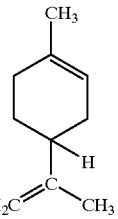 | 25 | 50 |
| isoamyl acetate 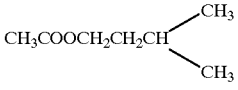 CH₃COOCH₂CH₂CH(CH₃)CH₃ | 15 | 70 |
| benzyl propionate 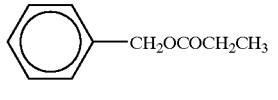 | 10 | 80 |
| ethyl butyrate CH₃CH₂CH₂COOC₂H₅ | 15 | 70 |

As is clear from Table 1, whichever solvent was used it was possible to reduce the volume of the foam polystyrene by more than 50%. In particular, in the case wherein benzyl propionate was used, it was possible to cause the volume to contract as much as 80%. These are the results of cases where the amount of solvent used was set at 1 ml, and in the case of any of the compounds much more contraction is possible if the amount used is increased (see FIG. 14).

Thus all the solvents shown in Table 1 can be suitably used for dissolving foam polystyrene. Also, it is possible to use a solvent made by mixing two or more of the above-mentioned solvents in the same way.

Figure 16:
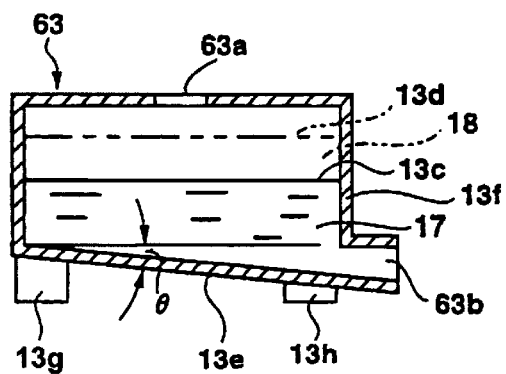
FIG. 16 is a sectional view of another liquid container which can be used.

The container 13 used in the example described above is provided with a discharge hole 13b in a bottom wall 13e, but instead of this it is possible to provide a discharge hole in the side wall 13f thereof. FIG. 16 is a sectional view of a container constructed in this way.

That is, the container 63 of FIG. 16 has its bottom wall 13e sloping at an angle θ with respect to the horizontal plane, and below the side wall 13f of the deepest side a discharge hole 63b is provided below the bottom wall 13e and below the level of the shallowest side.

By pointing the discharge hole 63b in a transverse direction from the side wall 13f in this way, it is possible to make the structure of the solvent supply part 3 of FIG. 6 simple.

This is because it is possible to supply the solvent 17 along the container bottom surface sloping at the angle θ safely and easily into a foam polystyrene dissolving apparatus just by inserting the discharge hole 63b slightly into the housing 1. That is, by making the bottom wall 13e slope and providing the discharge hole 63b at the bottom of the deepest side, when supplying the solvent 17 into the foam polystyrene dissolving apparatus it is possible to make the amount of solvent 17 remaining in the container 63 very small. The same merits are obtained also when supplying polystyrene solution 18 into the polystyrene recycling apparatus of FIG. 12.

The slope angle θ, considering the viscosity of the polystyrene solution, is preferably made 5° to 15°. In this case, the viscosity of the polystyrene solution should be considered to be about 10,000 cps at a concentration of 30%. So that the container 63 can be loaded onto the truck shown in FIG. 11 systematically, preferably leg parts 13g, 13h having different heights are provided on the underside of the bottom wall 13e to make the container as a whole substantially horizontal.

Figure 17:
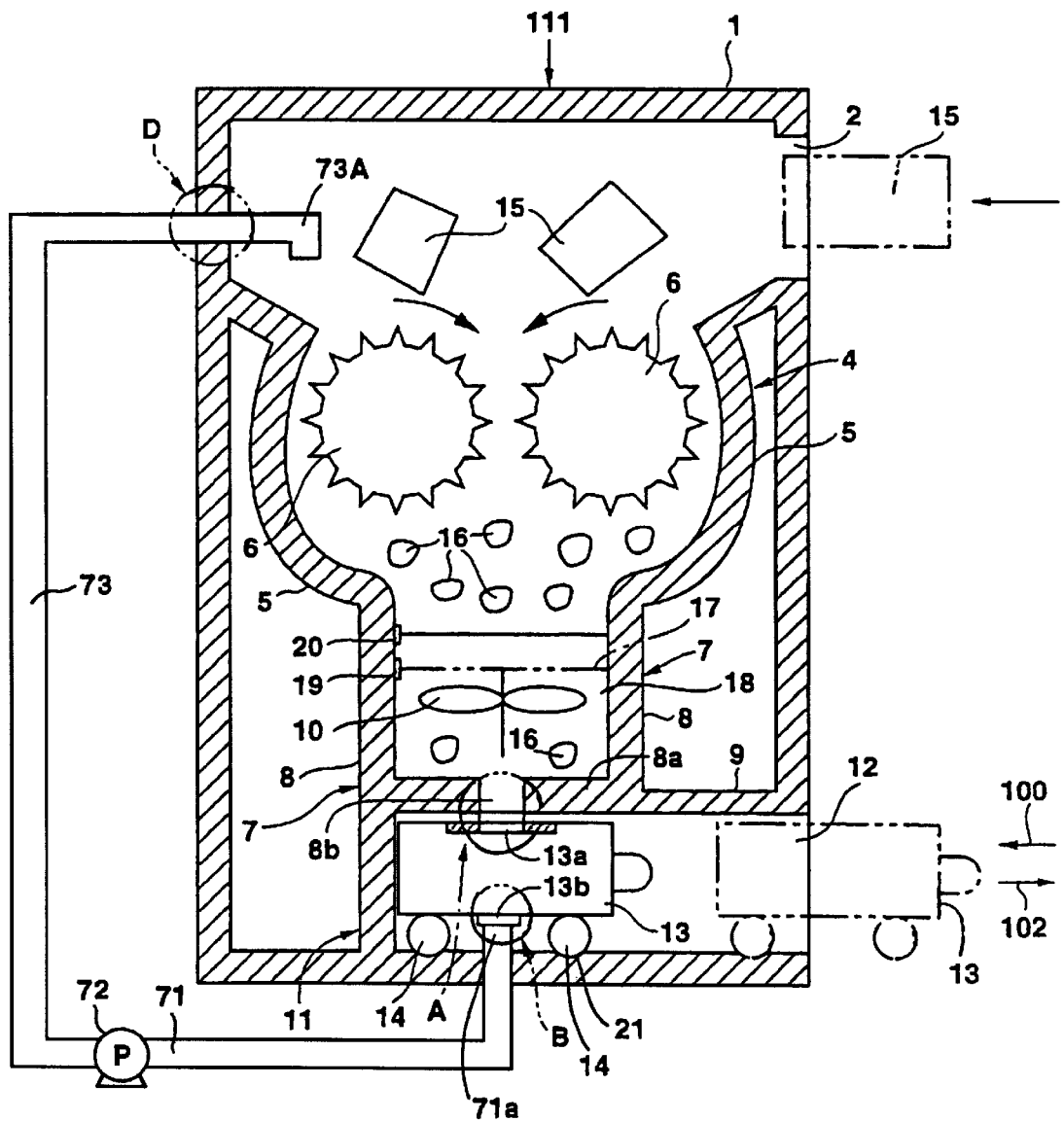
FIG. 17 is a sectional view of a foam polystyrene dissolving apparatus according to another preferred embodiment of the first through third aspects of the invention.

FIG. 17 shows another preferred embodiment of the first through third aspects of the invention applied to a discarded foam polystyrene dissolving apparatus.

A dissolving apparatus 111 according to this preferred embodiment, compared with the dissolving apparatus 101 of FIG. 6, is different in that solvent supplying and foam polystyrene solution receiving are carried out with the container 13 attached to the storing part 11. FIG. 17 is a schematic sectional view of the foam polystyrene dissolving apparatus 111 basically the same as FIG. 6, and parts common with FIG. 6 are shown with the same reference numerals.

A conduit 71 passing through the bottom wall of the housing 1 is connected to a pump 72, and a conduit 73 connected to the pump 72 passes through an upper part of a side wall of the housing 1 and an end part 73a thereof is positioned above the dissolving part 4. The conduit 71 is attachable to the container 13, and the conduit 73 may be fixed to the housing 1.

The end part 71a of the conduit 71 is attachable to the discharge hole 13b of a container 13 placed in the storing part 11. Otherwise, this foam polystyrene dissolving apparatus 111 is the same as the foam polystyrene dissolving apparatus of FIG. 6.

Dissolving of foam polystyrene is carried out in the following way. First, a container 13 holding solvent 17 is loaded into the storing part 11, the end part 71a of the pipe 71 is connected to the discharge hole 13b of the container 13 and a valve which will be discussed later is opened. The pump 72 is then driven and the solvent 17 inside the container 13 is sucked through the pipe 71 and fed through the pipe 73 to the dissolving area 7 of the dissolving part 4. When all the solvent inside the container 13 has been transferred, the drive of the pump 72 is stopped and the valve which will be discussed later is closed.

Next, in the same way as described above with reference to FIG. 6, in the dissolving area 7 foam polystyrene small pieces 16 dissolve in the solvent 17 and become polystyrene solution 18.

When during this dissolving the conduit 71 is detached from the discharge hole 13b of the container 13 and this dissolving finishes, in the same way as in the example of FIG. 6 the polystyrene solution 18 is received into the container 13 having supplied the solvent and become empty. This container is then sent to a polystyrene recycling apparatus in the same way as described above, receives new solvent and is again returned to the dissolving apparatus 111.

In the foam polystyrene dissolving apparatus 111 of FIG. 17, because both supplying of solvent and receiving of polystyrene solution are carried out with the container 13 installed in the storing part 111, it is not necessary to move the container during the dissolving operation and operation of the apparatus becomes easier.

Figure 18A:
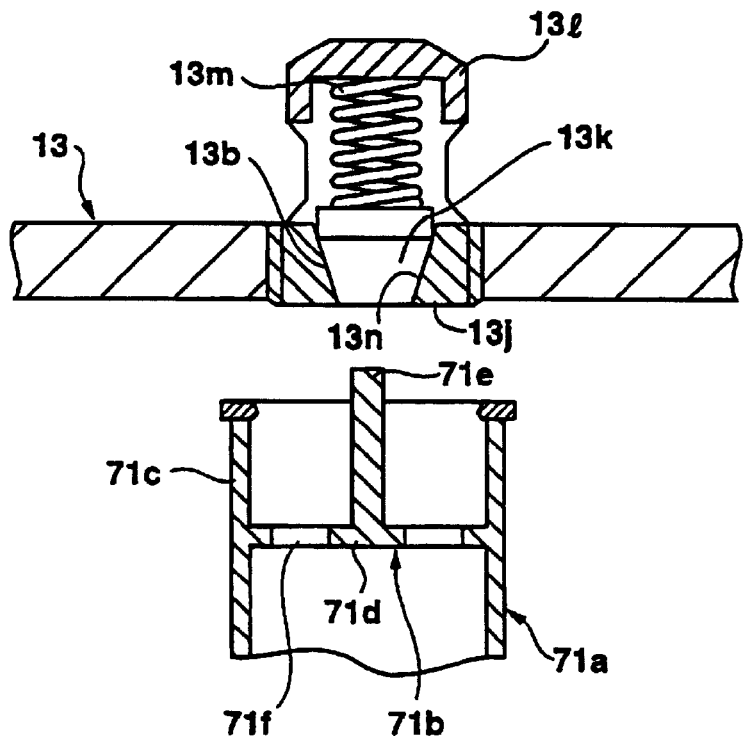
FIGS. 18A and 18B enlarged sectional views of the part B of this apparatus.
Figure 18B:
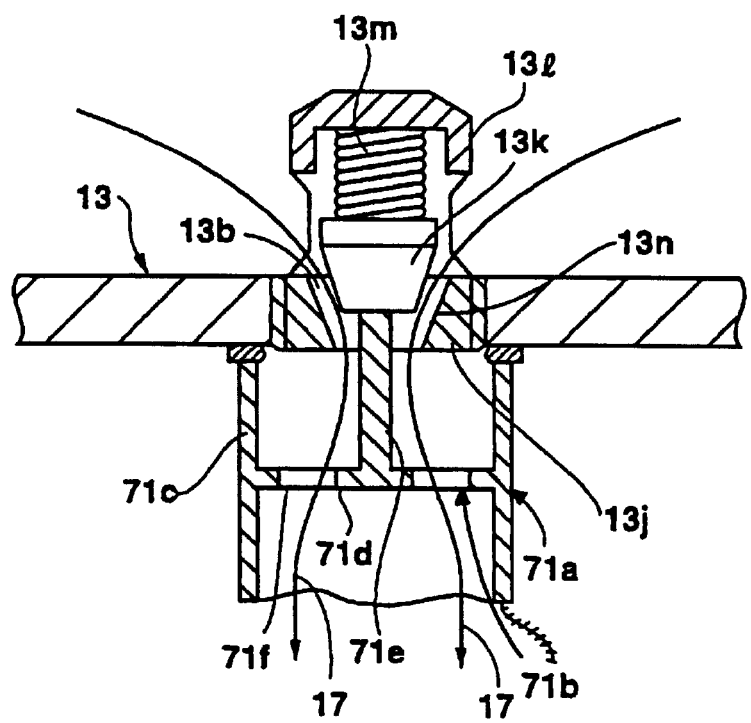

FIGS. 18A and 18B are enlarged sectional views showing the end part 71a of the conduit 71 and the discharge hole 13b. FIG. 18A shows the state immediately before the container 13 is connected to the conduit end part 71a. The container 13 is of the same structure as that shown in FIG. 8 and FIG. 9. The conduit end part 71a is connected to the conduit main body (71 of FIG. 17) by way of a socket (not shown). A push mechanism 71b like that shown in FIG. 9 is provided in the conduit end part 71a. That is, the push mechanism 71b is integrally made up of a tubular part 71c, a push pin supporting plate 71d provided with an annular through hole 71f, and a push pin 71e. An annular seal member 71g is fixed to the upper end of the tubular part 71c.

When the container 13 is connected to the conduit end part 71a, as shown in FIG. 18B, the push pin 71e abuts with the poppet valve member 13k and the poppet valve member 13k rises against the urging force of the coil spring 13m and moves away from the valve seat 13j, and as a result the through hole 13n opens and solvent 17 passes through the discharge hole 13b and is supplied to the dissolving area 7 from the container 13 as shown with arrows through the conduit end part 71a and the conduits 71, 73 of FIG. 17.

Figure 19:
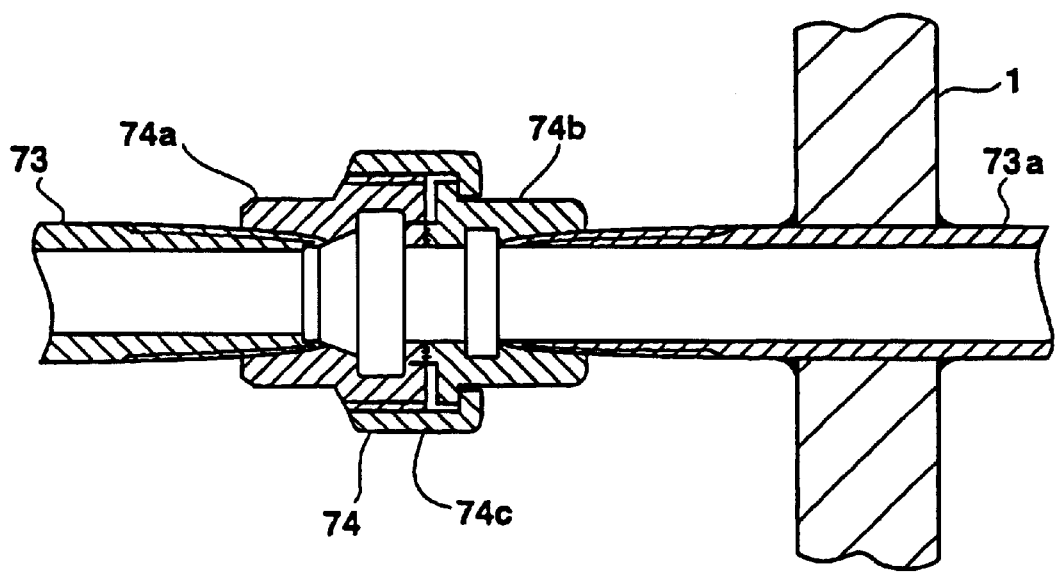
FIG. 19 is an enlarged sectional view of the part D of this apparatus.

FIG. 19 is an enlarged sectional view showing the part where the conduit 73 passes through the side wall of the housing 1. The conduit end part 73a of the conduit 73 passes through one of the side walls of the housing 1 and is airtightly fixed to the housing 1 by welding. The conduit leading end part 73a and the conduit 73 are connected by a union joint 74. The union joint 74 is made up of a union screw 74a, a union collar 74b and a union nut 74c. Because this pipe connection using the union joint is made without rotating the pipe just by rotating the union nut and because the conduit 73 is detachable from the conduit end part 73a, the arrangement is convenient for assembly and inspection and repair of the apparatus.

For the union joint, because solvent passes through it, using a gasket at risk of dissolving in the solvent is not desirable, and preferably a brass union joint wherein sealing is carried out by contact between metals is used.

In both of the preferred embodiments described above, foam polystyrene moldings 15 are broken up above the dissolving area 7 and the foam polystyrene small pieces 16 produced fall into the dissolving area 7 and dissolve in the solvent apd become a polystyrene solution.

Figure 20:
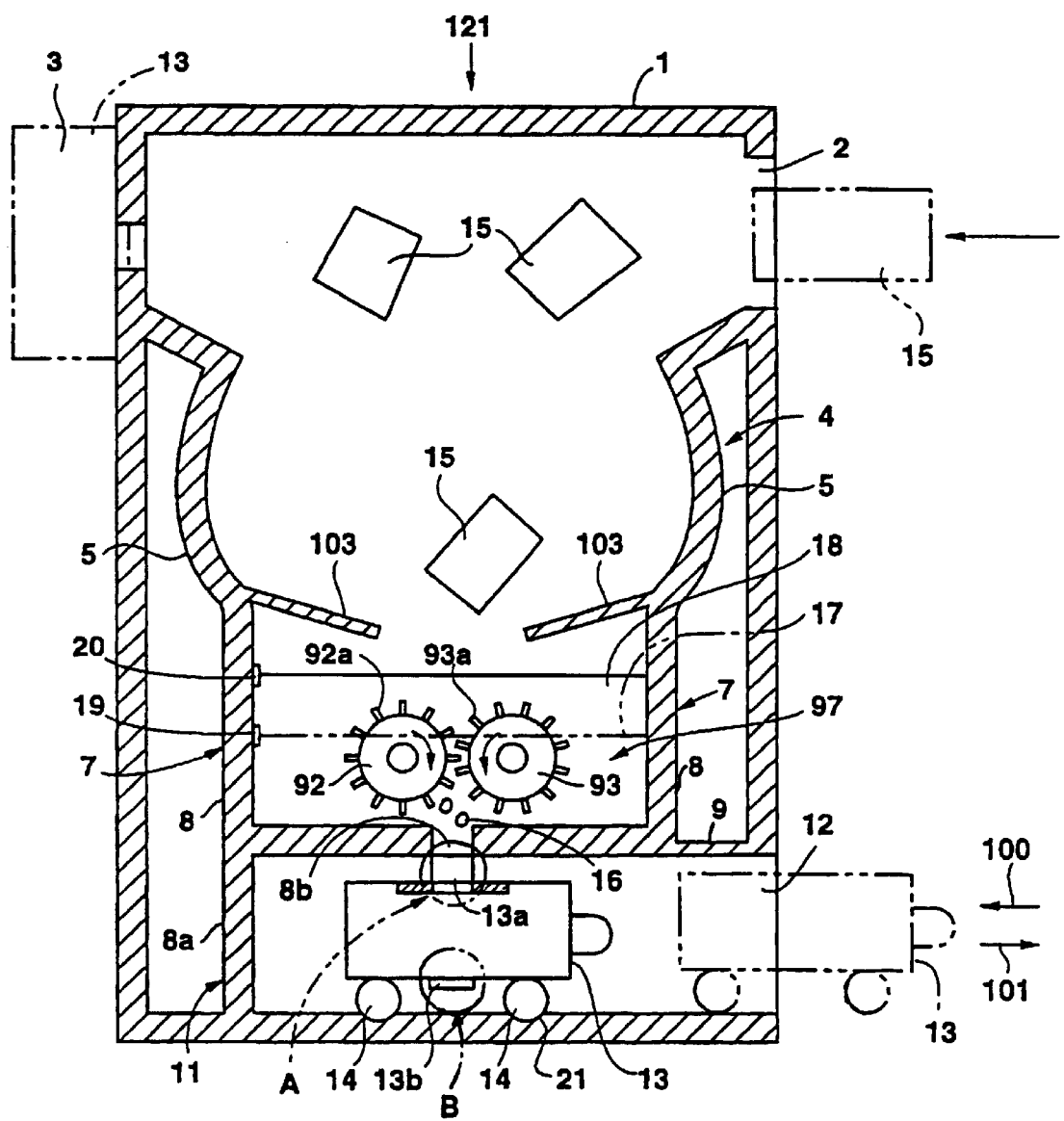
FIG. 20 is a sectional view of a foam polystyrene dissolving apparatus according to further preferred embodiment of the first through third aspects of the invention.

However, it is possible to construct the apparatus so that the above-mentioned breaking-up is carried out in the dissolving area 7 and the above-mentioned breaking-up and dissolving are carried out simultaneously. FIG. 20 shows a foam polystyrene dissolving apparatus 121 constructed in this way, and is a schematic sectional view similar to FIG. 6 and FIG. 17.

In FIG. 20, a pair of breaking-up rollers 92, 93 are disposed inside a dissolving area 97 larger than that of FIG. 6. Numerous breaking-up blades 92a, 93a are provided on each of the breaking-up rollers 92, 93, and these blades 92a, 93a mutually mesh without making contact (the wheels 6 of FIG. 6 may also be constructed in this way).

Sensors 19, 20 are provided on one of the side walls 81 of the dissolving area 97, and solvent 17 is supplied up to the level of the sensor 19 shown with a broken line.

The solvent 17 is supplied to the dissolving area 97 directly from the container 13 in the same way as in the example of FIG. 6. Or, as in FIG. 17, it may be supplied to the dissolving area 97 by a pump 72 from a container 13 placed in the storing part 11.

When the solvent 17 has been supplied up to the level of the broken line, the breaking-up rollers 92, 93 rotate as shown by the arrows and foam polystyrene moldings 15 fed in through the opening 2 pass between a pair of guide plates 103, 103 and fall onto the breaking-up blades 92a, 93a and are broken up by the rotation of these blades 92a, 93a and become foam polystyrene small pieces 16.

These foam polystyrene small pieces 16 dissolve in the solvent 17 and become polystyrene solution 18, and the volume of the solution becomes larger than that of the solvent 17. When the liquid surface of the polystyrene solution 18 rises to the level shown with a solid line, the sensor 20 detects this and outputs a signal to stop foam polystyrene moldings 15 being fed in.

A stirring impeller of the kind shown in FIG. 6 may be disposed on the bottom wall of the dissolving area 97. However, because stirring is also amply performed by the above-mentioned breaking-up rollers 92, 93 at the same time as breaking-up, it is not always necessary to provide a stirring impeller.

When the dissolving described above finishes, a valve (the valve 8d of FIG. 7) opens below the bottom wall of the dissolving area and a fixed quantity of polystyrene solution 18 passes through the solution inlet opening 13a of the container 13 and is received into the container 13. Otherwise, this apparatus is the same as that of FIG. 6.

In the construction of FIG. 20, by disposing the breaking-up rollers 92, 93 inside the dissolving area 97, it is possible to make the foam polystyrene dissolving apparatus of a simple construction and small.

FIG. 21 through FIG. 26 show a preferred embodiment of the first aspect of the invention applied to processing of discarded foam polystyrene.

Figure 21:
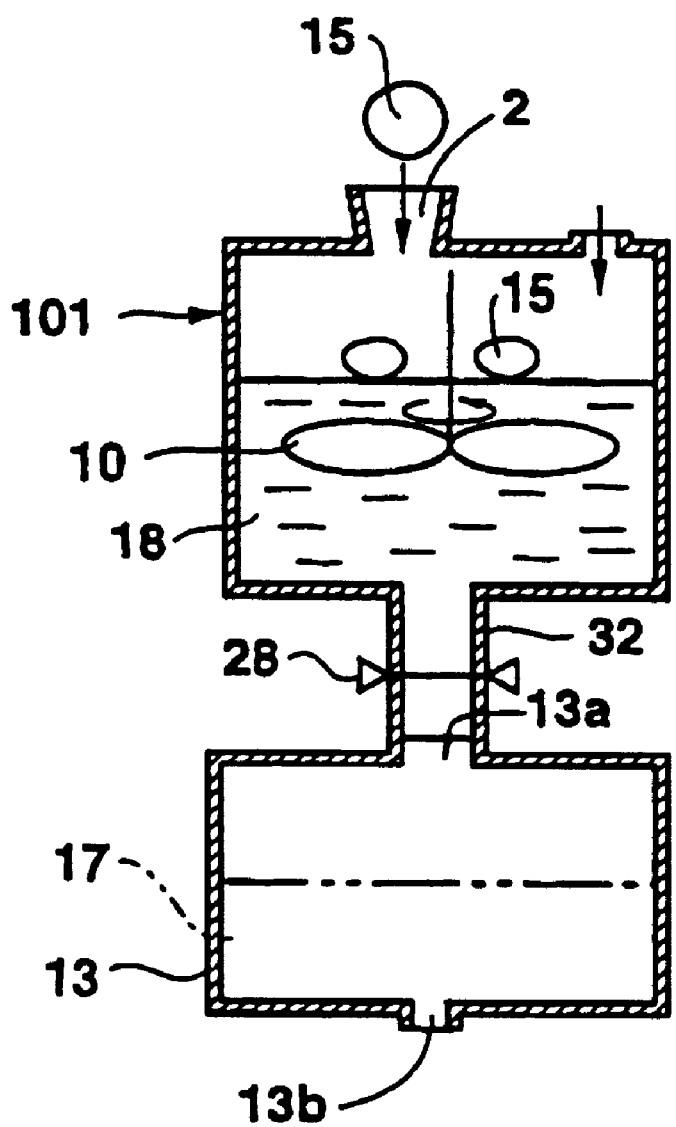
FIG. 21 is a schematic sectional view of a foam polystyrene dissolving apparatus according to a preferred embodiment of the fourth aspect of the invention.

FIG. 21 is a schematic sectional view of a polystyrene dissolving apparatus and a liquid container according to this preferred embodiment.

A container 13 is positioned below a foam polystyrene dissolving apparatus 101. A solution discharge pipe 32 in which is disposed a valve 28 is connected to a bottom wall of the foam polystyrene dissolving apparatus 101, and the end part of the solution discharge pipe 32 is inserted into an opening 13a in the container 13.

A solvent 17 (for example limonene) is supplied from the container 13 to inside the foam polystyrene dissolving apparatus 101 in a way which will be discussed later, and a stirring impeller 10 is disposed so as to be immersed in this solvent. When foam polystyrene moldings 15 are fed in through an opening 2 in the foam polystyrene dissolving apparatus 101, the stirring impeller 10 rotates and while breaking up the foam polystyrene moldings 15 stirs these together with the solvent and the foam polystyrene moldings 15 dissolve in the solvent and become a polystyrene solution 18.

When the dissolving finishes, the rotation of the stirring impeller 10 is stopped and the valve 28 is opened, and the polystyrene solution 18 produced inside the foam polystyrene dissolving apparatus 101 passes through the solution discharge pipe 32 and is received into the container 13.

Figure 22:
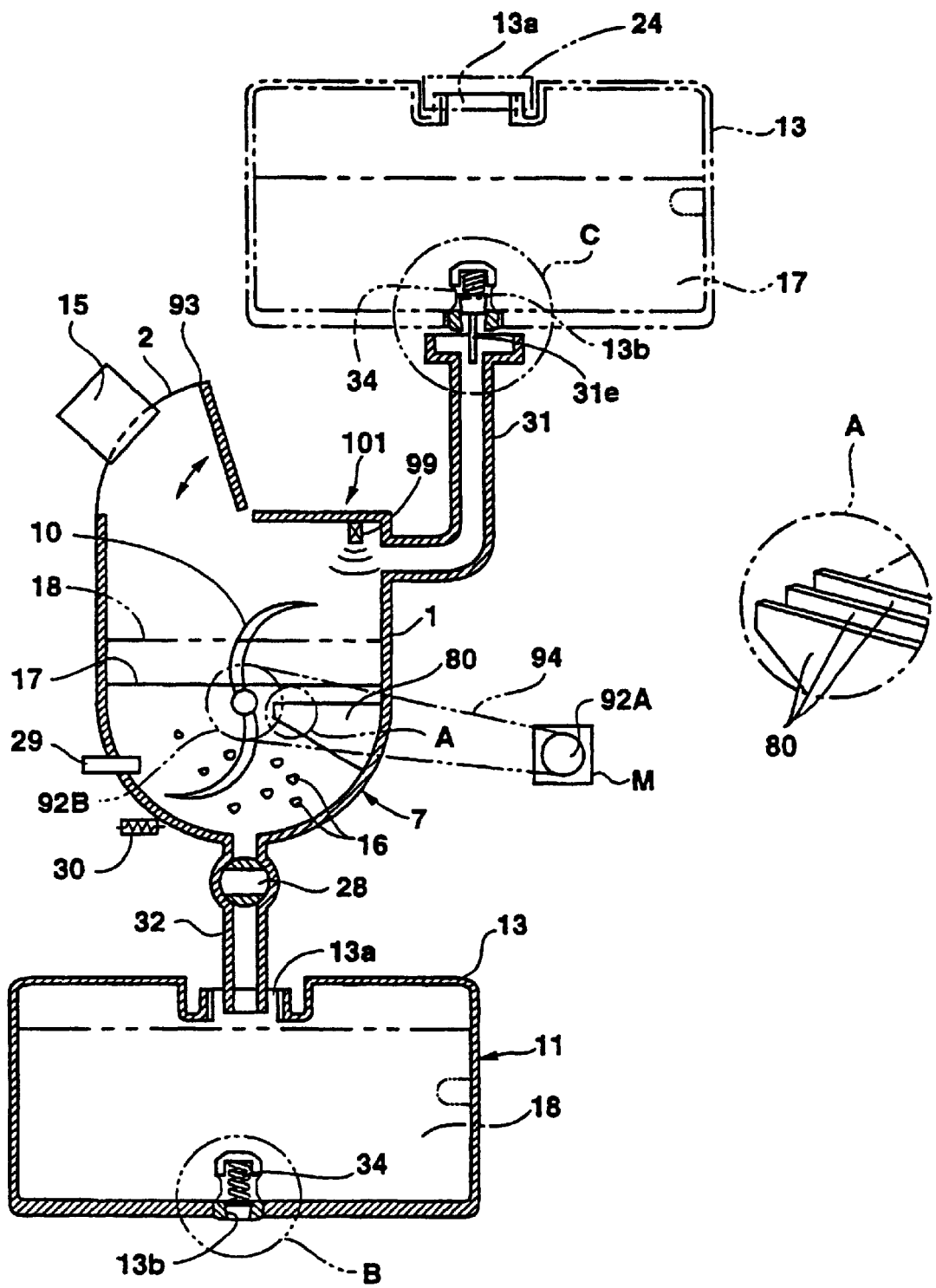
FIG. 22 is a detailed sectional view of this apparatus.

FIG. 21 shows the relationship between the foam polystyrene dissolving apparatus 101 and the container 13 in this example extremely schematically, and these are specifically constructed as shown in FIG. 22.

An open/closeable lid 3 is provided on a top part of a housing 1 of the foam polystyrene dissolving apparatus 101, and this lid 3 can be opened and foam polystyrene moldings 15 can be fed into the foam polystyrene dissolving apparatus 101 through the opening 2.

On a side wall of the housing 1, a plurality of breaking-up assisting plates 80 are arranged in parallel with each other and fixed to the inner surface (see enlarged perspective inset view of part A), and a plurality of stirring impellers 10 are disposed so as to pass between these breaking-up assisting plates 80.

The breaking-up assisting plates 80 and over half of the stirring impellers 10 and are disposed in positions such that they are immersed in the solvent 17 supplied from the container 13. The stirring impellers 10 are rotated by the drive of a motor M by way of a belt 94 and pulleys 92A, 92B, and together with the breaking-up assisting plates 80 they break up the foam polystyrene moldings 15 fed in into foam polystyrene small pieces 16 and thereby make them more easily dissolved in the solvent 17 and stir these small pieces 16 and the solvent 17 and thereby promote dissolving of the small pieces 16 in the solvent 17.

An ultrasonic sensor (or optical sensor) 99 is disposed on an upper wall of the housing 1 and detects the liquid surface level of the solvent 17 or the polystyrene solution 18. Because it is necessary to supply a predetermined quantity of the solvent 17, and when it dissolves polystyrene its volume increases, and it is necessary to make the polystyrene solution a predetermined concentration (for example 30%), the detection of these levels is important. When these liquid surfaces have reached predetermined levels, it emits a signal to stop the solvent supply or the feeding in of foam polystyrene moldings. However, because a predetermined quantity of the solvent 17 is held in the container 13, detection of the solvent liquid surface is only carried out for the sake of confirmation.

Also, a temperature sensor 29 and a heater 30 are disposed on a lower part of the housing 1 and in cold locations can be used to keep the solution warm.

A solvent feed pipe 31 is connected to a side wall of the housing 1, a container 13 holding solvent 17 is supported on the end of the solvent feed pipe 31 as shown with broken lines and a poppet valve 34 of the container 13 is positioned above the end of the solvent feed pipe 31. Since this positioning is achieved by ordinary means it is not shown in the drawing.

When the container 13 is set on the end of the solvent feed pipe 31, the poppet valve 34 is opened by the pressure of a push pin 31e and the solvent 17 inside the container 13 passes through the solvent feed pipe 31 under its own weight and is supplied into a solvent area 7 of the foam polystyrene dissolving apparatus 101. During this transfer of the solvent 17, so that the pressure inside the container 13 does drop and hinder transfer of the solvent, a cap 24 (shown with broken lines) is removed from the container. Opening and closing of the poppet valve 34 will be described later with reference to FIG. 24.

The solution discharge pipe 32 is connected to the lowest part of the housing 1, and the container 13 is positioned in a solution storing part 11 so that the end of the solution discharge pipe 32 passes through the opening 13a. This positioning is also carried out by ordinary means.

When the container 13 is in this state, the poppet valve 34 is closed. When the above-mentioned dissolving in the solvent area 7 finishes, the valve 28 is opened and the polystyrene solution 18 passes through the solution discharge pipe 32 and is received into the container 13.

Thus, using one container 13 it is possible to perform both the functions of supplying the solvent 17 and receiving the polystyrene solution 18. When the supplying of the solvent has finished, the empty container is removed from the solvent feed pipe 31 and can be connected to the solution discharge pipe 32.

Figure 23A:
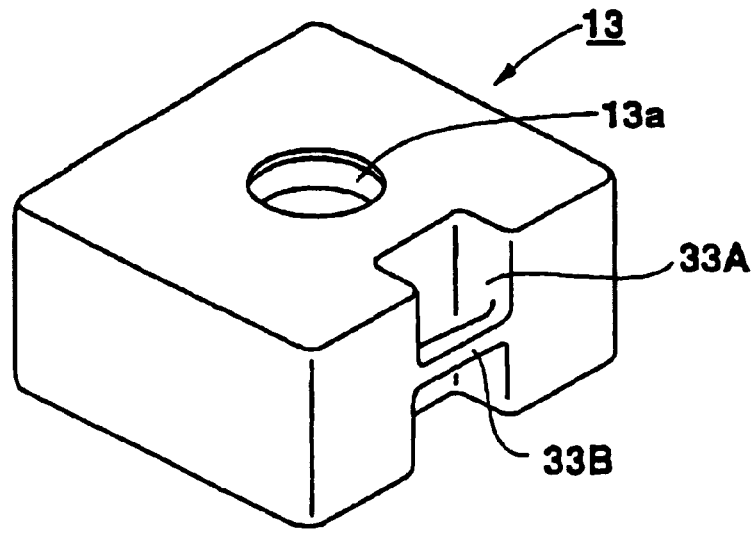
FIG. 23A is a perspective view seen from above and FIG. 23B a perspective view seen from the bottom side of the liquid container shown in FIG. 22.
Figure 23B:
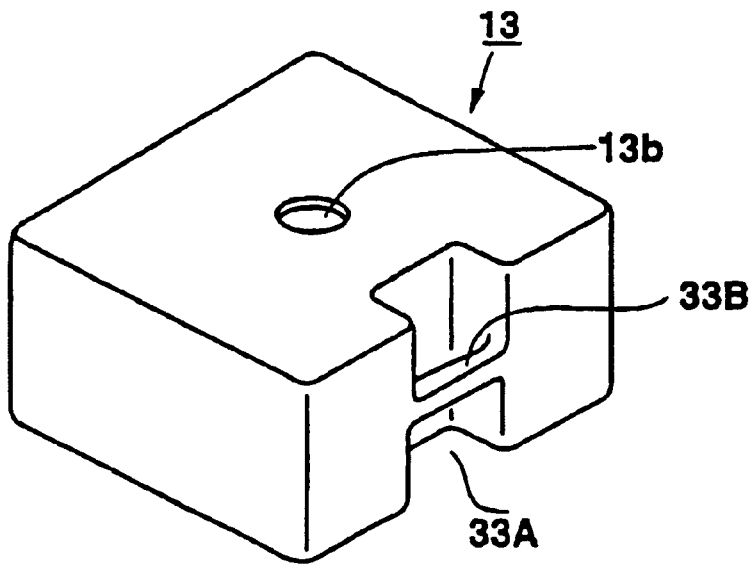

FIGS. 23A and 23B show a container 13, FIG. 23A being a perspective view seen from above and FIG. 23B being a perspective view seen from the bottom side. What attention should be paid to in this example is that as a result of providing the opening 13a in the top face of the container and the opening 13b in the bottom face of container it is possible to respectively selectively connect the solvent feed pipe 31 to the former and the discharge pipe 32 to the latter, and therefore when carrying out discharging of the polystyrene solution 18 and supplying of the solvent 17 there is no need for swinging around of pipes or hoses accompanying the kind of interchanging of pipes and hoses described above and a small space is sufficient.

What attention should also be paid to in this example is that the opening 13a in the top face of the container 13 is made larger than the opening 13b in the bottom face. As a result of constructing the container 13 this way, as well as passing the end of the solution discharge pipe 32 through the opening 13a becoming easy, because it is possible to make the solution discharge pipe 32 large in diameter so that the polystyrene solution 18, whose viscosity reaches as much as 10,000 cps as described above, flows more easily and can be fed into the container 13 in a short time, the ease of operation of the apparatus is improved. The operation of receiving the solvent 17 into the container 13 also becomes easy.

Also, not only can the polystyrene solution 18 of course be supplied from the container 13 into a polystyrene recycling apparatus through the opening 13b as discussed with reference to FIG. 12, but it is also possible to turn the container 13 upside down and discharge the solution 18 through the large opening 13a. In the latter case the operation of discharging the polystyrene solution 18 also becomes easy.

Also, in a case where to supply the polystyrene solution 18 to a polystyrene recycling apparatus a pump is used to suck it out, when the solution is taken out through the opening 13b provided in the bottom face it is possible to utilize a discharging action due to the weight of the polystyrene solution 18 itself and the power consumed for driving the pump is reduced. It is sufficient if the area ratio of the openings 13a and 13b exceeds 1:1, but (1:0.8) to (1:0.2) is preferable.

In the container 13 of this example a concave part 33A is provided in one of the side faces and a handle 33B is disposed between the sides of the concave part 33A to facilitate carrying by hand.

In this preferred embodiment also, a solution discharging opening 13b (the part B in FIG. 22) the same as that shown in FIG. 8 is provided in the container 13, but an illustration and description thereof here will be omitted.

Figure 24:
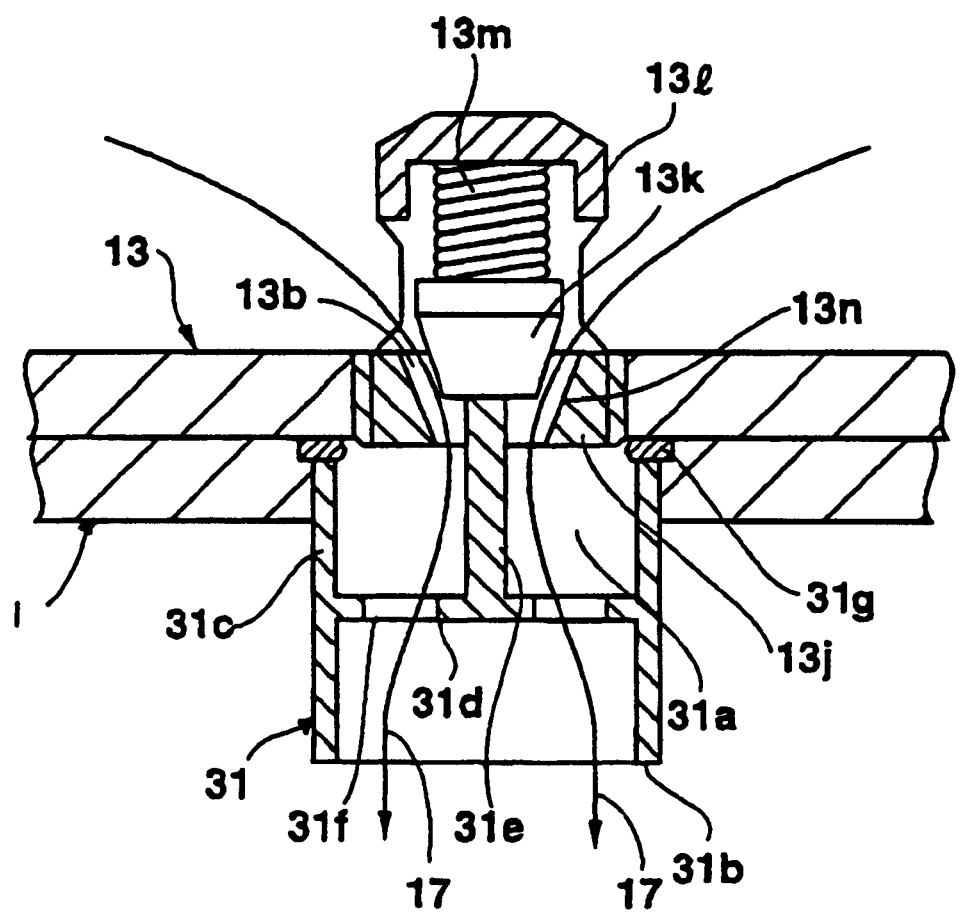
FIG. 24 is an enlarged sectional view of the part C of the apparatus shown in FIG. 22.

FIG. 24 is an enlarged sectional view showing the solution discharging opening 13b (the part C in FIG. 22) of the container 13 of FIG. 22. A push mechanism 31b is disposed on the end of the solvent feed pipe 31. The push mechanism 31b is integrally made up of a tubular part 31c and a push pin support plate 31d provided with an annular through hole 31f and a push pin 31e. An annular seal member 31g is fixed to the upper end of the tubular body 31c.

The container 13 is normally in the same state as that shown in FIG. 8. When the container 13 is set on the upper wall of the housing 1 as shown in FIG. 24, the push pin 31e abuts with the poppet valve member 13k and against the urging force of the coil spring 13m the poppet valve member 13k rises and moves away from the valve seat 13j, and as a result the through hole 13n opens and the solvent 17 passes through the solvent supply hole 13b and is supplied from the container 13 into the housing 1 as shown by the arrows.

Also in the case of transferring polystyrene solution from inside the container 13 into the waste recycling apparatus of FIG. 12, it is possible to use the same mechanism as that of FIG. 24.

In this preferred embodiment also, as shown in FIG. 10, in the container 13 when holding solvent and being taken to the above-mentioned dissolving apparatus, the solvent 17 is held up to the level 13c shown with a solid line in FIG. 10. In the way described above foam polystyrene is dissolved in the solvent and the solution 18 produced has a greater volume than the solvent 17 and is received up to the level 13d shown with a broken line. Inside the container 13 a space 131 is formed above the solution 18 and safety standards are thereby satisfied.

The method for carrying the solution 18 safely to a foam polystyrene recycling apparatus after removing the container 13 holding the solution 18 from the dissolving apparatus 101, the structure of the container 13 and how the dissolving apparatus 101 is used are the same as described above with reference to FIG. 6 through FIG. 16 and therefore a description thereof here will be omitted.

Also concerning results of experiments wherein the above-mentioned d-limonene and besides that isoamyl acetate, benzyl propionate and ethyl butyrate were used as solvents, the same results as those of Table 1 were shown.

With this preferred embodiment also, in a foam polystyrene dissolving and recycling system using a solvent, the above-mentioned benefits (1) through (5) can be obtained.

Figure 25:
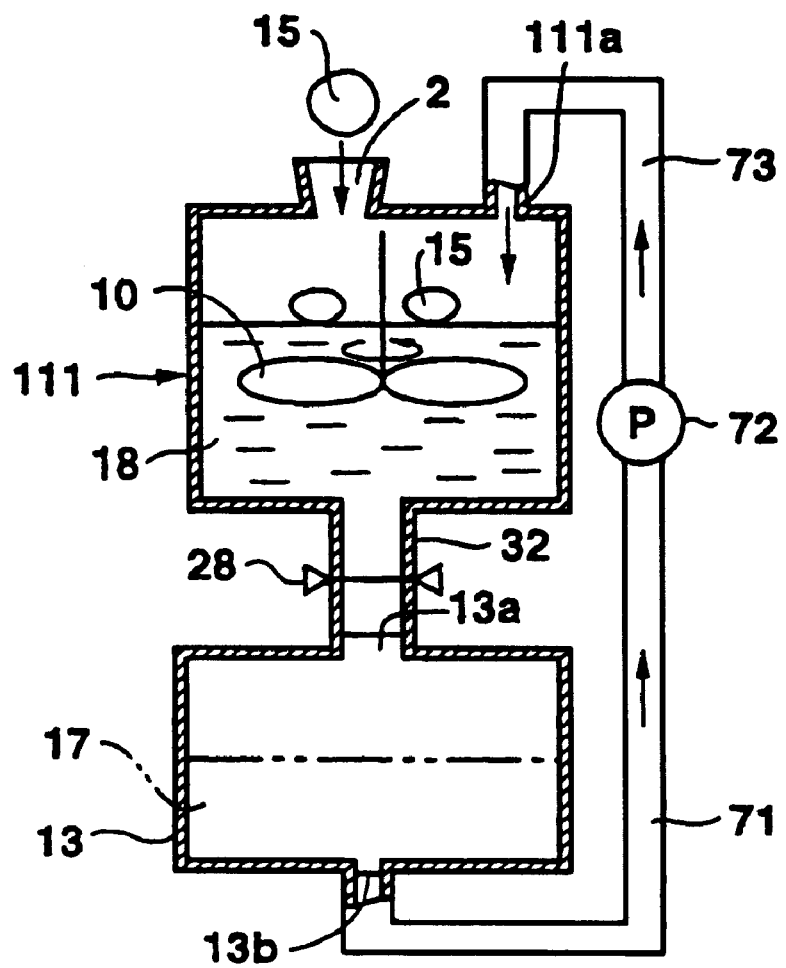
FIG. 25 is a schematic sectional view of a foam polystyrene dissolving apparatus according to another preferred embodiment of the fourth aspect of the invention.

FIG. 25 is a schematic sectional view similar to FIG. 21 showing another preferred embodiment of the first aspect of the invention applied to a discarded foam polystyrene dissolving apparatus.

A dissolving apparatus 111 according to this preferred embodiment, compared with the dissolving apparatus 101 of FIG. 21, is different in that solvent supplying and solution receiving are carried out with the container 13 connected. FIG. 25 is a schematic sectional view of the foam polystyrene dissolving apparatus 111 basically the same as FIG. 21, and parts common with FIG. 21 are shown with the same reference numerals.

In this example, an opening 111a is provided in the upper wall of the foam polystyrene dissolving apparatus 111, and the opening 111a and the solution discharging opening 13b in the bottom wall of the container 13 are connected by conduits 71, 73. The conduits 71, 73 are connected by a pump 72.

Solvent 17 is received in advance into the container 13, and the solvent 17 is supplied to the foam polystyrene dissolving apparatus 111 via the conduits 71, 73 by the pump 72. At this time, the valve 28 is closed.

Next, in the same way as in the example of FIG. 21, foam polystyrene moldings 15 are dissolved in the solvent 17 and made into a polystyrene solution 18. When this dissolving has finished, the valve 28 is opened and the polystyrene solution 18 is fed into the container 13 from the foam polystyrene dissolving apparatus via the solution discharge pipe 32.

Figure 26:
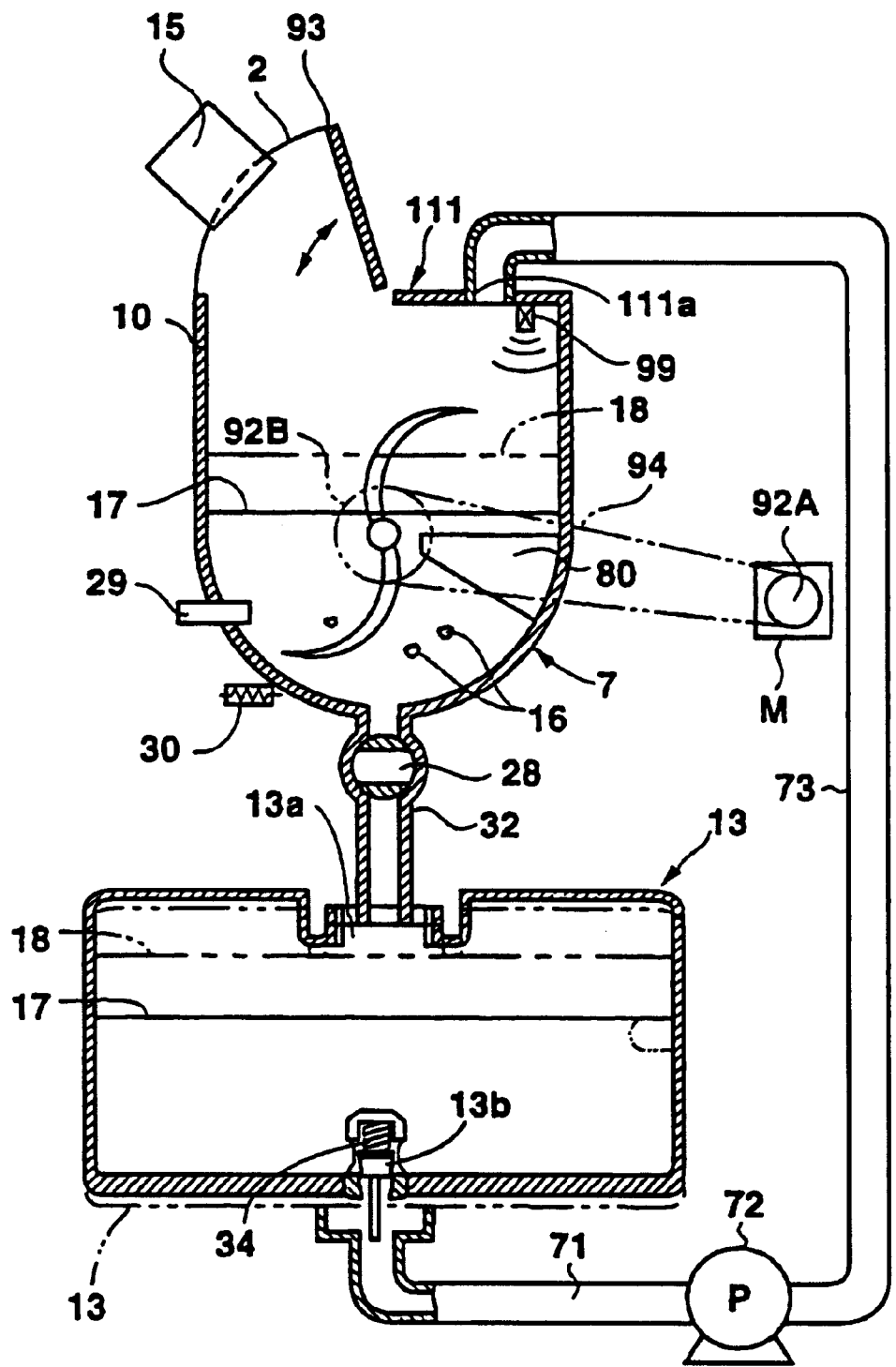
FIG. 26 is a detail sectional view of this apparatus.

FIG. 25 shows the relationship of the foam polystyrene dissolving apparatus 111 and the container 13 of this example extremely schematically, and these are specifically constructed as shown in FIG. 26 (in FIG. 26, parts common with FIG. 22 have been given common reference numerals).

As shown in FIG. 26, instead of the solvent feed pipe 31 of FIG. 22, the conduit 73 is connected to the upper wall of the foam polystyrene dissolving apparatus 111 and the conduit 71 is connected to the conduit 73 by way of the pump 72. The end of the conduit 71 is of the same structure as the end of the solvent feed pipe 31 of FIG. 22, and the conduit 71 is connected to the poppet valve 34 in the bottom wall of the container 13. The rest of the apparatus is the same structure as that shown in FIG. 22.

When a container 13 holding solvent 17 is set on the end of the conduit 71 as shown with broken lines, as described earlier with reference to FIG. 24 the poppet valve 34 opens. Then, the, the pump 72 operates and the solvent 17 is transferred into the foam polystyrene dissolving apparatus 111.

When the container 13 has become empty, the container 13 is slightly raised from the position shown with broken lines to the position shown with solid lines by a raising and lowering device (for example a cam mechanism). When this happens, the poppet valve 34 becomes closed as described earlier with reference to FIG. 8. As described above, when dissolving in the foam polystyrene dissolving apparatus 111 has finished, the valve 28 is opened and polystyrene solution is transferred from the foam polystyrene dissolving apparatus 111 into the empty container 13.

When this solution transfer has finished the container 13 is raised slightly and sufficiently moved away from the poppet valve 34, detached from the solution discharge pipe 32 and removed from the solution storing part 11. Because the opening 13a in the top face of the container 13 is large, this removal operation is carried out easily.

In this example, since as well as the same benefits as those of the example of FIG. 22 being provided it is not necessary to fit the container to the upper part of the apparatus because the solvent 17 is transferred by the pump 72, the height dimension of the apparatus as a whole can be made small. Also, because to supply the solvent 17 from the container 13 into the foam polystyrene dissolving apparatus 111 first the solvent is fed out downward through the solution discharging opening 13b, a discharging action owing to the weight of the solvent itself works and the power consumed in driving the pump decreases. This is also the same when the polystyrene solution 18 is discharged from inside the container 13.

FIG. 27A through FIG. 40 show preferred embodiments of the fifth aspect of the invention applied to processing of discarded foam polystyrene.

Figure 27A:
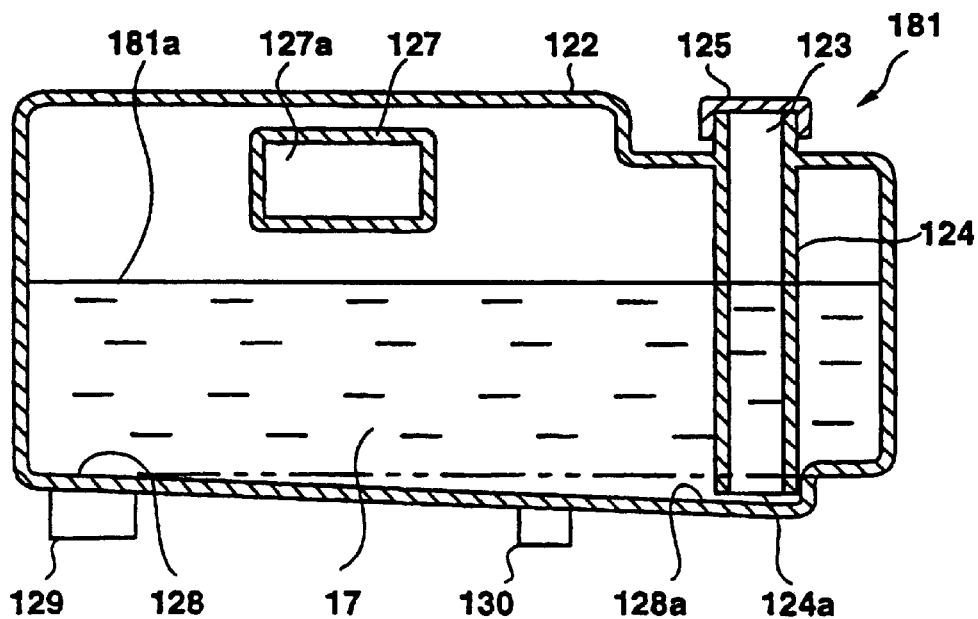
FIG. 27A is a sectional view on the line a—a in FIG. 27B and FIG. 27B a plan view of a liquid container according to a preferred embodiment of the fifth aspect of the invention.
Figure 27B:
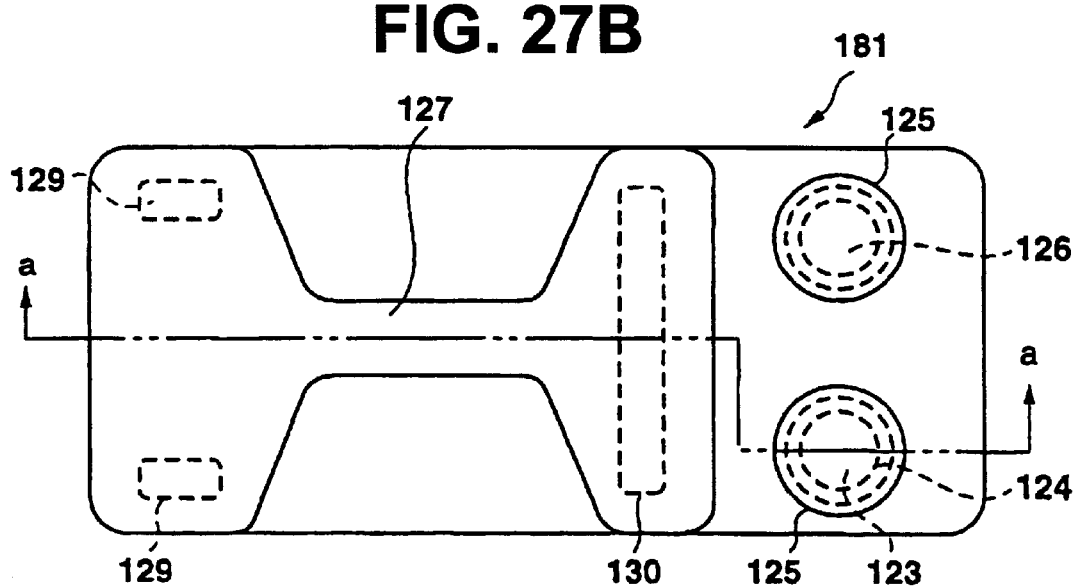

FIGS. 27A and 27B show a container 181 according to one of these preferred embodiments, FIG. 27A being a sectional view on the line a—a of FIG. 27B and FIG. 27B being a plan view.

The container 181 of this preferred embodiment, as shown in the drawings, is formed in a shape close to that of an approximate rectangular parallelopiped; an upper part of a discharge pipe (equivalent to a strainer pipe; similarly hereinafter) 124 formed integrally with a main body 122 forms a discharging opening 123, and a lower end part 124a at the opposite end of the pipe extends to the vicinity of the inside bottom surface of the main body 122. A charging opening 126 is disposed beside this discharging opening 123, and the two openings are each closed and sealed by an externally fitted cap 125.

The upper face of the container except for the part where the charging opening 126 and the discharging opening 123 are disposed is raised forming a slight step, and as shown in FIG. 27B a concave part is provided in both sides of the center of the upper face and a constricted part is thereby formed in the central part of the upper face and a through hole 127a is further provided there to form a handle 127. The bottom face 128 forms an inside bottom surface 128a sloping down toward the discharge pipe lower end part 124a.

On the underside of the container main body 122, projection-shaped legs 129 on the left and right at one end and at the opposite end to this a similarly projection-shaped leg 30 extending in the width direction are provided. These are shown with broken lines in FIG. 27B.

Because of the presence of these legs 129, 130 the bottom of the main body 122 does not directly make contact with the ground and does not rub against the ground and wear, and furthermore the container 181 is kept horizontal, and a solvent 17 (for example limonene) is effectively discharged through the lower end part 124a of the discharge pipe 124 because the lowest part 128a of the bottom face 128 becomes the deepest part of the container (this is also the same during discharging of the solution 18, which will be discussed later). For this, the discharge pipe 124 is preferably disposed as vertically as possible.

According to this preferred embodiment, because the discharge pipe 124 is integrally formed with the main body 122 of the container 181, when discharging the solution it is not necessary to insert a strainer pipe every time and furthermore manufacturing cost is reduced by integral molding. Also, by a handle being suitably provided, carrying is made easy.

Figure 28A:
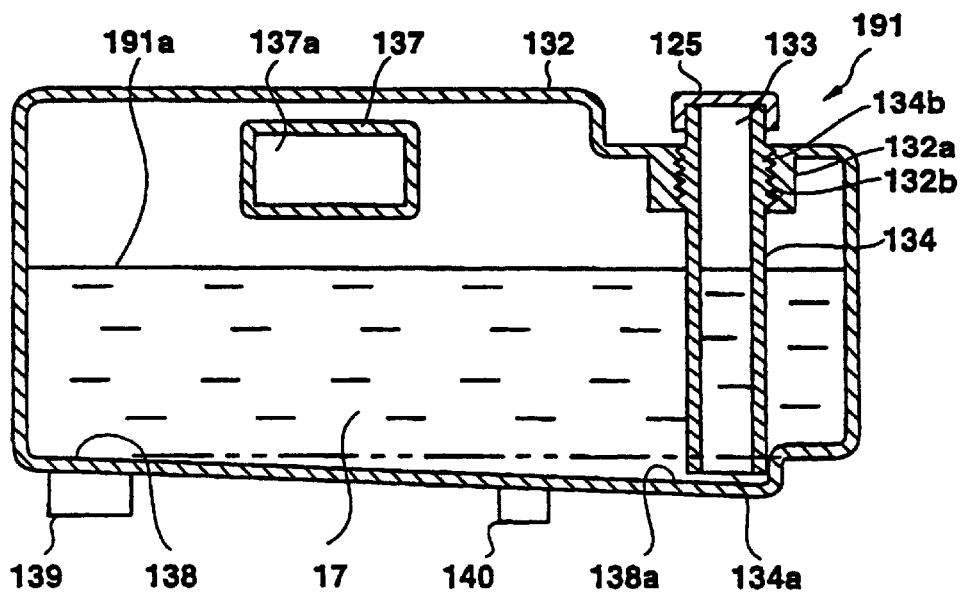
FIG. 28A is a sectional view on the line a—a in FIG. 28B and FIG. 28B a plan view of a liquid container according to another preferred embodiment of the fifth aspect of the invention.
Figure 28B:
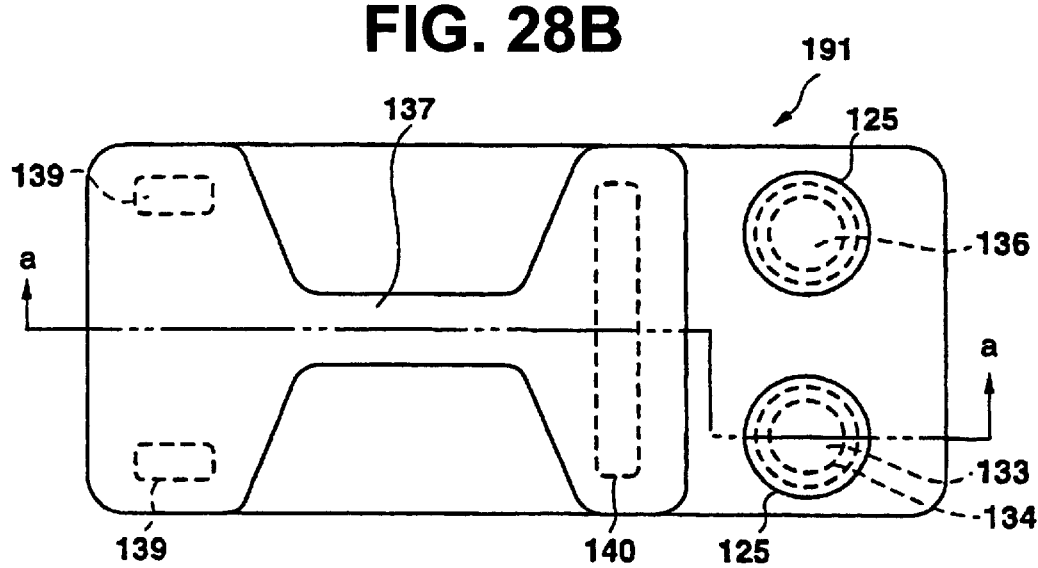

FIGS. 28A and 28B show another preferred embodiment of the fifth aspect of the invention, FIG. 28A being a sectional view on the line a—a of FIG. 28B and FIG. 28B being a plan view.

As shown in the drawings, the shape and function of this preferred embodiment are the same as in the preferred embodiment shown in FIGS. 27A and 27B, and all that differs is that the discharge pipe 134 is integrated with the main body 132 by screw means.

That is, inside the part of the main body 132 where the discharge pipe 134 is disposed a receiving part (boss part) 132a is provided and a male thread 134b is provided on the discharge pipe 134 and screwed into the receiving part 132a. Because the rest of the liquid container is the same as the preferred embodiment shown in FIGS. 27A and 27B a description thereof will be omitted.

Figure 29A:
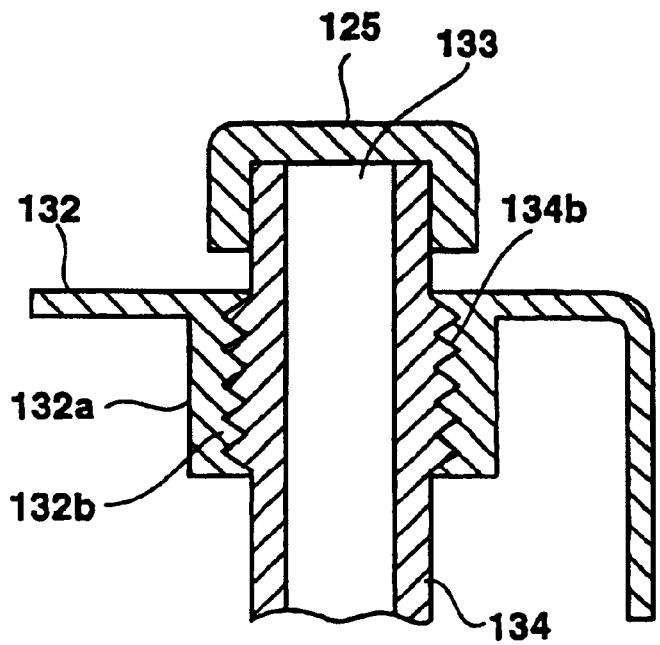
FIG. 29A is an enlarged sectional view of and FIG. 29B an enlarged sectional view of a modified example of the vicinity of a discharging opening of a liquid container according to the fifth aspect of the invention.
Figure 29B:
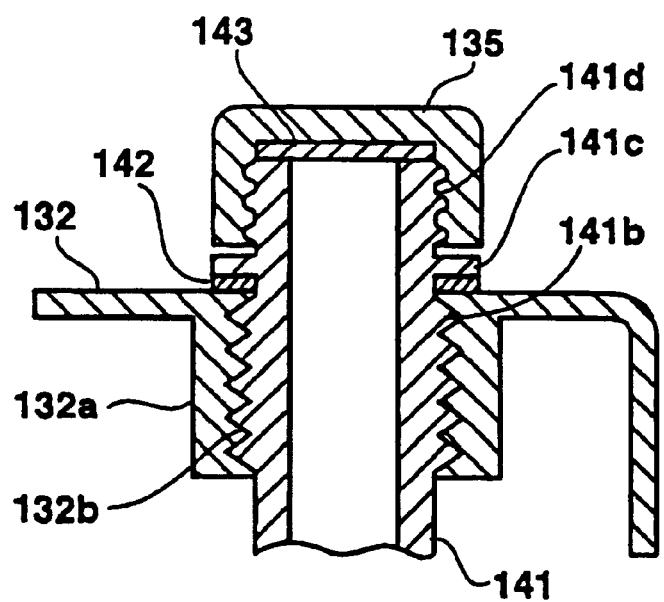

FIG. 29A is an enlarged sectional view of the discharging opening 133 vicinity of the preferred embodiment shown in FIGS. 28A and 28B; this part can also be made as in FIG. 29B.

That is, by providing a flange 141c on a part of a discharge pipe 141 exposed outside the container main body 132 and providing a packing 142 between this flange 141c and the main body 132, the degree of sealing is raised and it is possible to completely prevent liquid leakage. Furthermore, if a cap 135 also compresses a packing 143 and is joined to the top of the discharge pipe 141 by screw means, the sealing effect increases further.

According to this preferred embodiment, in manufacturing cost there is no great difference compared with the preferred embodiment shown in FIGS. 27A and 27B, and in addition to that it the same benefits as the preferred embodiment shown in FIGS. 27A and 27B there is also the merit that for example when a problem has arisen in the discharge pipe 134 or 141 it can be easily replaced.

FIGS. 30A and 30B are sectional views of an automatic valve of another preferred embodiment of the fifth aspect of the invention and show a discharging opening 133 in which this valve is disposed, FIG. 30A showing the closed state and FIG. 30B showing the open state of the valve.

Like the screw type in the preferred embodiment of FIG. 28A and FIG. 28B, a discharge pipe 145 is joined to the main body 132 by a screw thread 146. A spring seat 147 is provided in the discharging opening 133 vicinity of the discharge pipe 145, and a flange 149b of a poppet 149 abuts by way of a spring 148 with a flange 145a of the discharge pipe 145 formed at the discharging opening 133 facing inward and closes the discharging opening 133, and a shaft 149a of the poppet 149 fits slidably in a guide hole 147a of the spring seat 147 and the poppet 149 moves vertically.

Opening and closing of this valve is carried out by an outside mechanism to which the container is fitted. That is, by setting this container on a dissolving apparatus which will be discussed later, by engaging and disengaging a joint pipe 150 mounted on that apparatus with the discharging opening 133 of this container, it automatically opens and closes.

As shown in the drawings, a packing 152 is provided on the end of the joint pipe 150 for sucking up, and abuts with the flange 145a of the discharging opening 133 of the main body 132 and seals the joint of the joint pipe 150 with the flange 145a. A push pin 151 is provided in the middle of the joint pipe 150, and as shown in FIG. 30B when the joint pipe 150 is engaged with the discharging opening 133 the push pin 151 pushes in the poppet 149. Consequently, the solvent 17 (for example limonene) flows out as shown with arrows and is discharged from the liquid container through the joint pipe 150 (this is also the same during discharging of the solution 18). This discharging action of the joint pipe 150 on the solvent 167 will be discussed later.

This automatic valve can also be attached to a charging opening 136 of the container, as shown in FIG. 31. In the case of the charging opening 136, a part equivalent to the discharge pipe 145 of the kind in the case of discharge described above is unnecessary; a frame 153 of the valve mechanism is joined to the main body of the container 132 by a screw thread 153a, and by the other parts having the same construction and action as the case of discharge described above the solution 18 (for example limonene solution of foam polystyrene) produced by the apparatus flows from the apparatus side into the container under its own weight.

In this example the coil spring 148 is used as the means for pressing of the poppet 149, but as something to replace this it is possible to use the repelling force of a magnet. An apparatus which charges the solution 18 into this container which will also be discussed later.

According to this preferred embodiment, because the automatic valve doubles as a cap of the liquid container, compared to when there is a separate cap the labor of fitting and removing the cap is eliminated and just by setting the container it is possible to carry out charging or discharging and adapting to future automation becomes easy.

FIGS. 32A, 32B and 32C and FIGS. 33A and 33B show other preferred embodiments of the fifth aspect of the invention, wherein projection and recess mating parts are formed in the faces of the container and a function for increasing the safety of carrying by means of a transport vehicle or the like is thereby added.

Figure 32A:
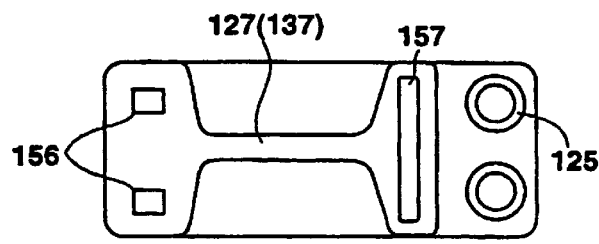
FIG. 32A is a plan view, FIG. 32B a front view and FIG. 32C a bottom view of a liquid container according to another preferred embodiment of the fifth aspect of the invention.
Figure 32B:
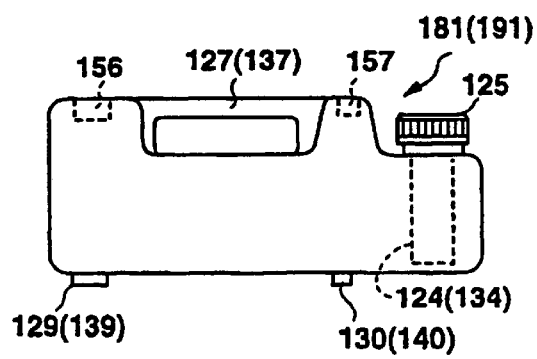
Figure 32C:
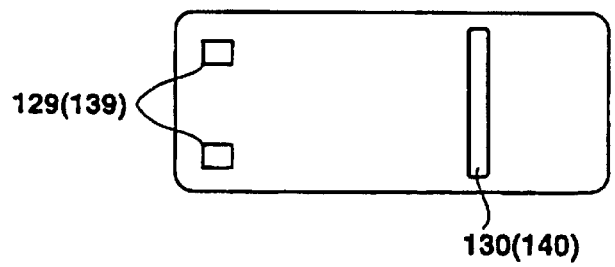

First, the case of FIGS. 32A, 32B and 32C is an example wherein projection and recess parts are provided in the upper face and the lower face of the container, FIG. 32A being a plan view of the container, FIG. 32B being a front view and FIG. 32C a bottom view of the same. As shown in the drawings, the legs 129 (139) and the legs 130 (140) in FIGS. 32B and 32C are the legs of the container in the preferred embodiment shown in FIGS. 27A and 27B and the preferred embodiment shown in FIG. 28A and FIG. 28B described above, and recess parts of the same shape and the same dimensions as these legs are formed in positions in the upper face of the liquid container corresponding to the positions of these legs.

By this means, when the container is stacked, the legs 129 (139) and the legs 130 (140) of the container 181 (131) stacked on top fit into recess parts 156 and 157 in the upper face of the container 181 (191) positioned therebelow. Therefore, during storage and also during carrying they do not readily break loose and safety can be maintained.

Figure 33A:
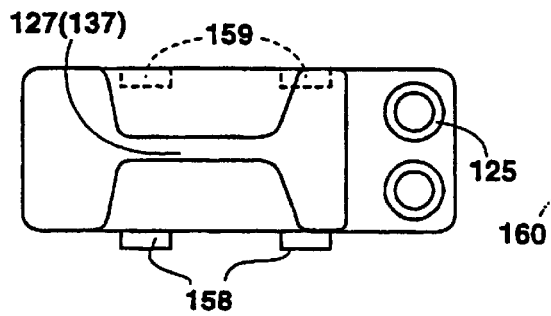
FIG. 33A is a plan view and FIG. 33B a front view of a liquid container according to another preferred embodiment of the fifth aspect of the invention.
Figure 33B:
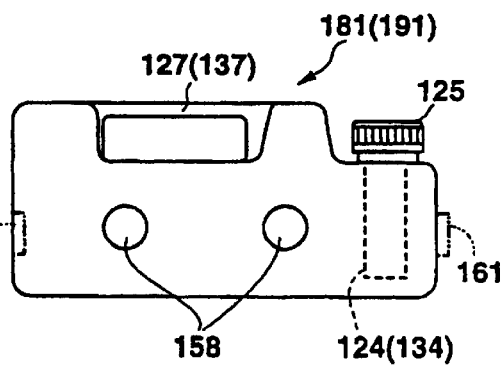

FIGS. 33A and 33B show an example wherein projections and recesses 158, 159 are provided in the side faces of the liquid container, FIG. 33A being a plan view and FIG. 33B being a front view. In this case also by the same function, for example when lined up in a row the liquid containers are prevented from slipping forward or backward, and for example it is also possible carry them turned on their sides and stacked vertically. As shown with broken lines, projections and recesses can also be provided in the front-rear direction like a projection part 161 corresponding to a recess part 160 at the opposite end.

Figure 34:
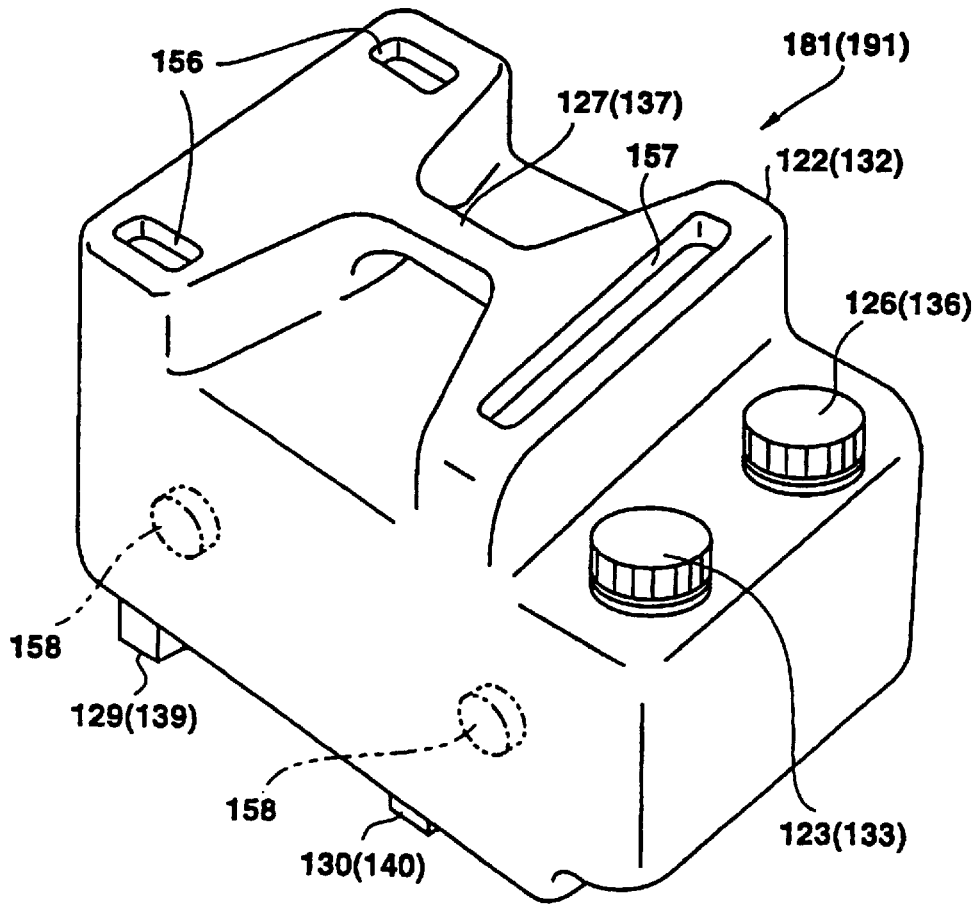
FIG. 34 is a perspective view of a liquid container according to another preferred embodiment of the fifth aspect of the invention.

FIG. 34 is a perspective view showing a container provided with the projection and recess mating described above. By forming the container in this way, even in cases when several containers are for example loaded on a simple trolley and moved over a short distance on premises or the like, the containers are stable and safety is maintained.

Figure 35:
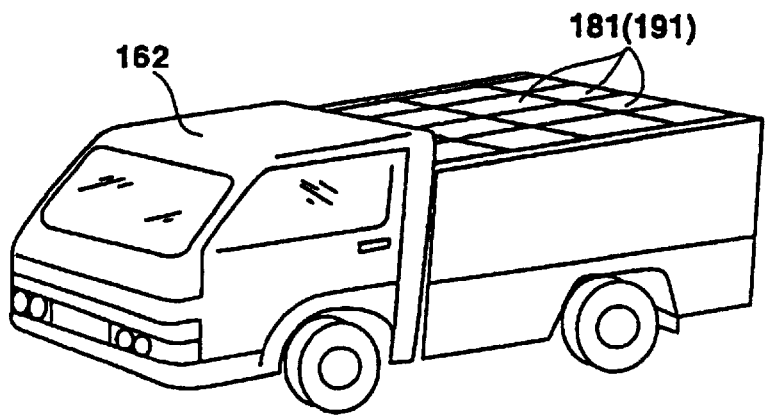
FIG. 35 is a perspective view of liquid containers according to the fifth aspect of the invention loaded onto a transport vehicle.

In particular, when loading them onto a transport vehicle 162 and transporting them as shown in FIG. 35, it is possible to stack them and transport a large quantity simultaneously, and furthermore it is possible to transport them safely.

The liquid container of this preferred embodiment has the kinds of merit described above, and this liquid container is used for transferring of processing liquid between a foam polystyrene dissolving apparatus and a recycling processing apparatus which will be discussed later.

Figure 36:
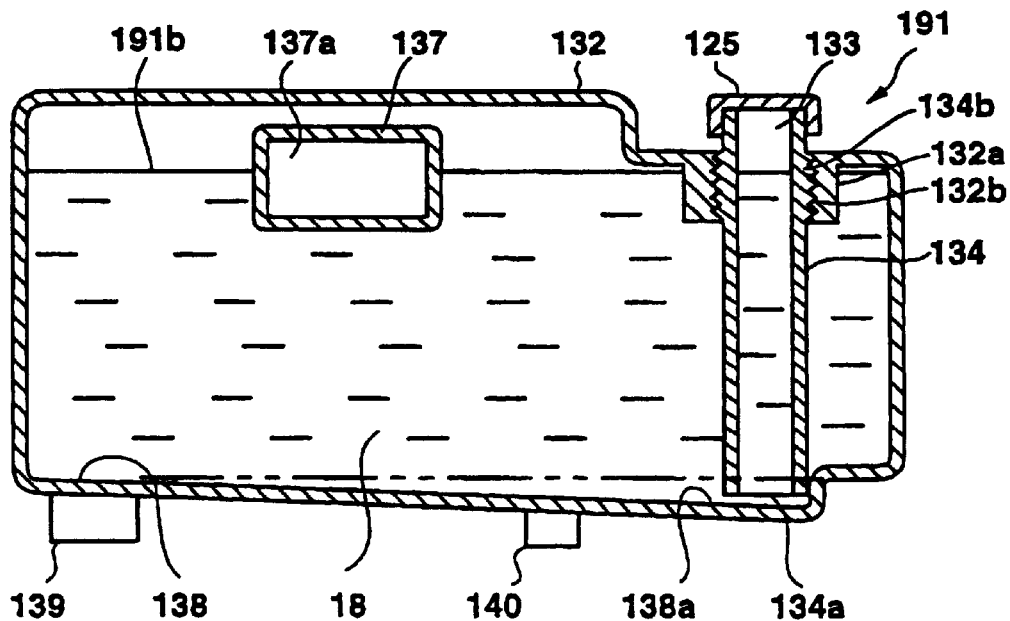
FIG. 36 is a sectional view of a liquid container according to the fifth aspect of the invention containing a solution.

FIGS. 27A and 27B and FIGS. 28A and 28B show states of solvent 17 to be supplied to a dissolving apparatus contained up to liquid surface levels 181a and 191a, and FIG. 36 shows solution 18 produced from supplied solvent charged from a recycling processing apparatus up to a liquid surface level 191b. Hereinafter, for convenience of description, the container and reference numerals of FIGS. 28A and 28B will be used.

A container 191 charged with solution 18 as shown in FIG. 36 is transported to a recycling processing apparatus which will be discussed later, and there discharges the solution. However, this container 191 is not one with which a conventional type of pump for sucking out as described above is used, and for discharging of solution in the recycling processing apparatus in this preferred embodiment it is a container developed with the object of discharging by means of compressed air as shown in FIG. 37.

Figure 37:
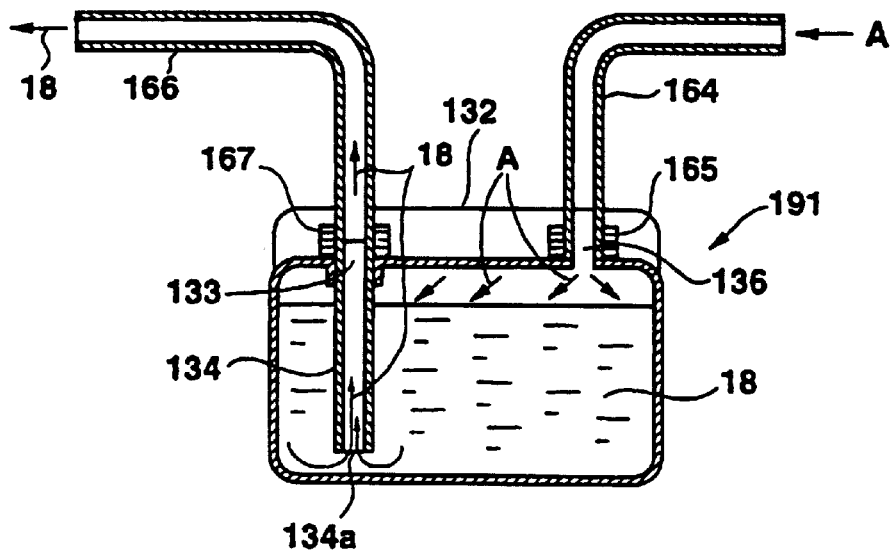
FIG. 37 is a schematic illustration of a method for discharging solution from this liquid container.

FIG. 37 shows this method schematically. A recycling processing apparatus is equipped with an air feed pipe 164 and an outlet pipe 166 or the like, and as shown in the drawing an adaptor 165 of the air feed pipe 164 is fitted to the charging opening 136 of the container 191 and an adaptor 167 of the outlet pipe 166 is fitted to the discharging opening 133 of the container 191.

Then, if compressed air A is fed through the air feed pipe 164 into the container 191, a high air pressure acts on the entire liquid surface inside the container 191 and the solution 18 is easily pushed out through the lower end 134a of the discharge pipe 134 and into the outlet pipe 166.

In results of experiments, by means of compressed air of 12 atmospheres even a highly viscous solution can be discharged in about half of the time of a conventional case of using a pump. The effectiveness of this kind of air pressure is remarkable, and taking a solution out of a small container can be effectively carried out even with a pressure of about 10 g/cm$^2$ using a syringe or a hand pump.

Figure 38:
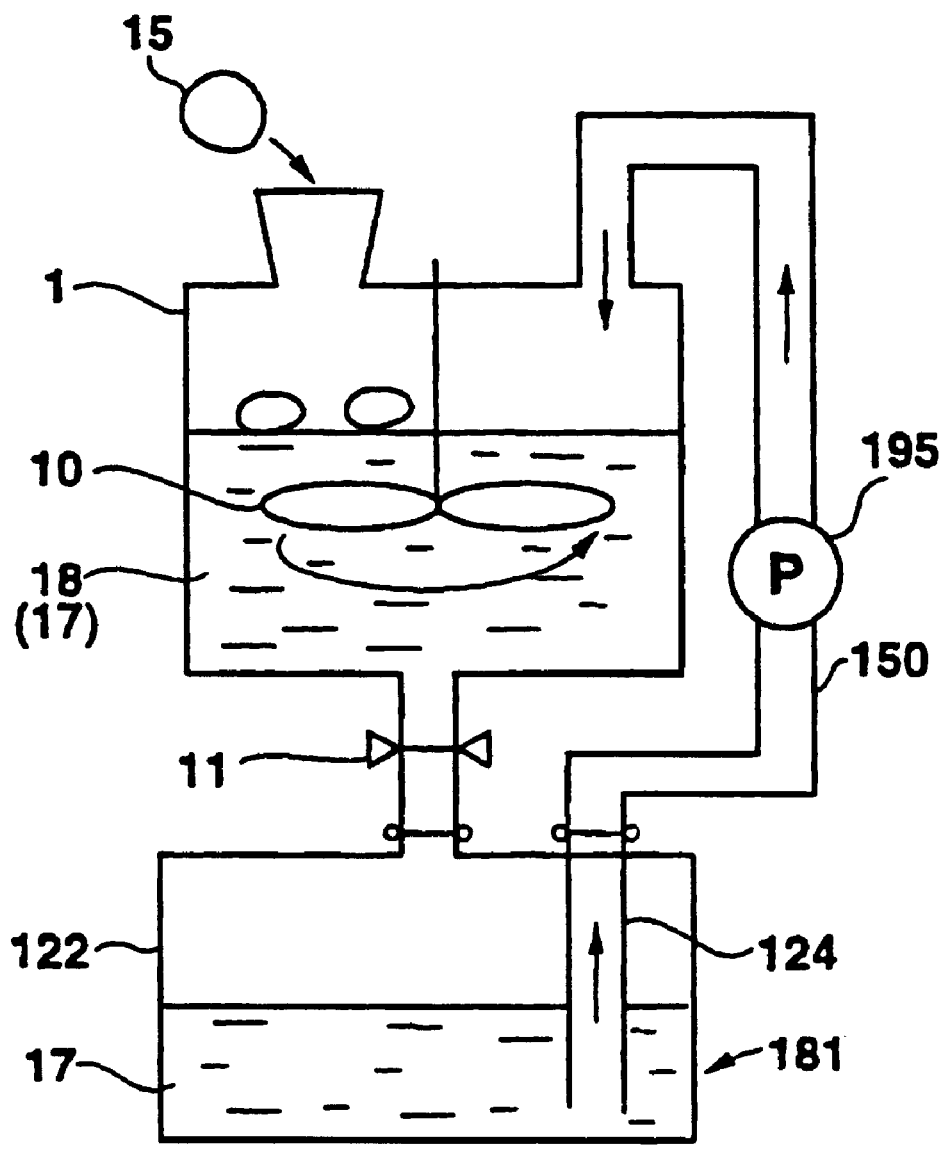
FIG. 38 is a schematic view of the construction of a dissolving apparatus with which a liquid container according to the fifth aspect of the invention can be used.

FIG. 38 is a view showing schematically a container of the kind described above and a dissolving apparatus, and shows a situation wherein a solvent 17 is sucked up from a container 181 and supplied to a reducing container 1 by a pump 195 and while foam polystyrene 15 fed into the reducing container 1 is stirred by stirring impellers 10 the foam polystyrene 15 is dissolved to produce a solution liquid 18. More specifically, for example the kind of apparatus shown in FIG. 39 is used.

Figure 39:
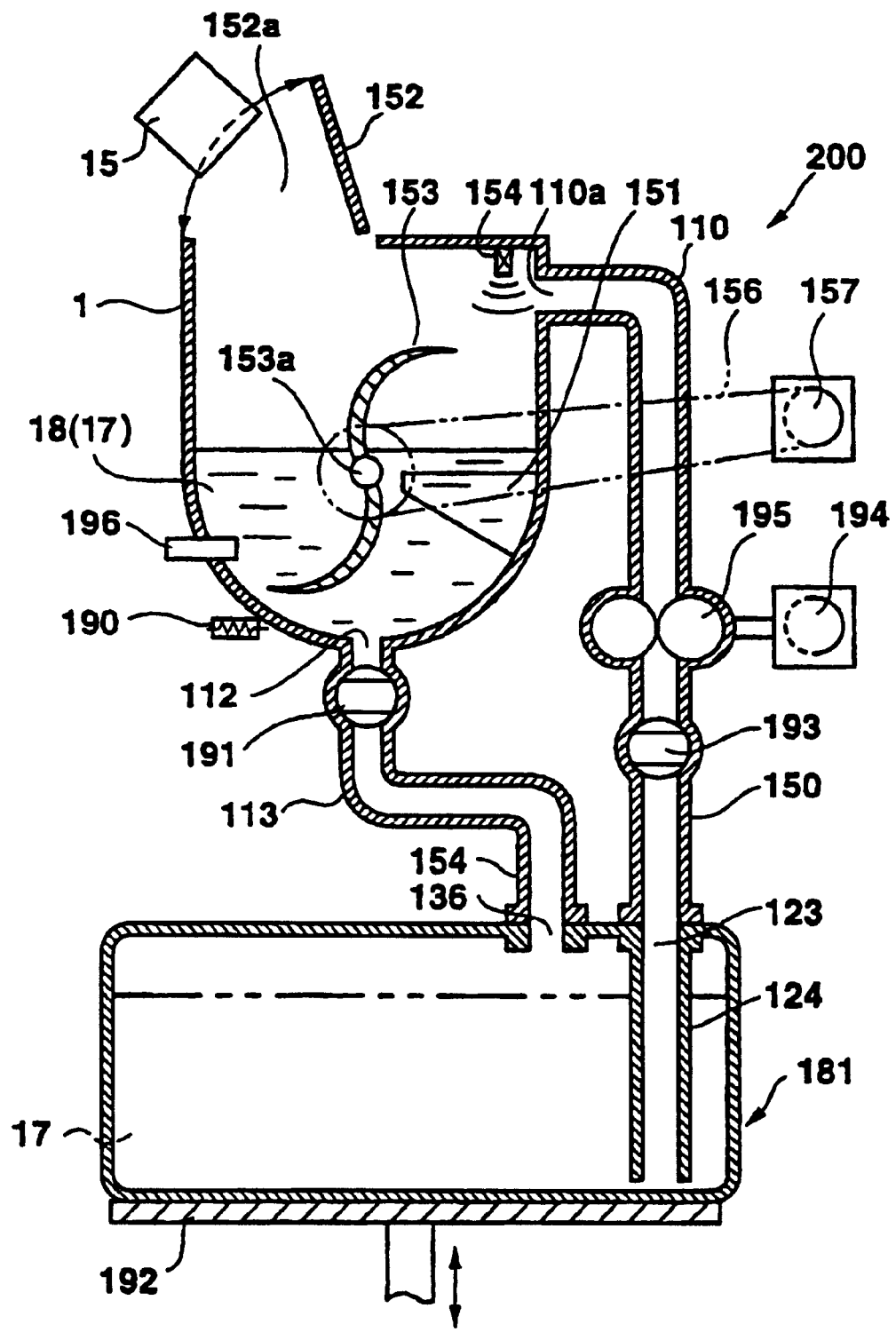
FIG. 39 is a sectional view of main parts of this dissolving apparatus.

FIG. 39 is a sectional view of a container 181 fitted to this dissolving apparatus 200. That is, the lower part of the reducing container 1 is formed with a semi-circular cross-section and an opening and closing lid 152 is provided over half a flat face of a top part and a feeding-in opening 152a is thereby formed. Inside the reducing container 1 a plurality of stirring impellers 153 having a shaft 153a mounted on the reducing container 1 are provided, this shaft 153a is driven by a motor 157 mounted outside by way of a chain 156 and the ends of the stirring impellers 153 stir as far as the vicinity of the bottom surface of the reducing container 1.

Inside the reducing container 1, breaking-up assisting plates 151 are mounted on one wall surface near the bottom part thereof and improve the function of breaking-up the foam polystyrene 15 fed in through the feeding-in opening 152a performed by the stirring impellers 153.

An inlet opening 110a is provided in one side of the upper part of the reducing container 1, and from there an inlet pipe 110 is provided extending in the vertical direction, and as an extension part thereof the joint pipe 150 is provided. A gear pump 195 driven by a motor 194 is disposed between the inlet pipe 110 and the joint pipe 150, and a valve 193 is disposed below that.

The end of the joint pipe 150 is joined to the discharging opening 123 of the container 181, and via the discharge pipe 124 provided integrally with the container 181 the solvent 17 shown with a broken line inside the container 181 is supplied to the reducing container 1. An outlet opening 112 is provided in the bottom part of the reducing container 1, an outlet pipe 113 is provided extending downward from there, a valve 191 is provided in the outlet pipe 113 and a joint part 154 of the end of the outlet pipe 113 is joined to the charging opening 136 of the container 181.

The container 181 is removable, and if placed on a vertically movable tray 192 disposed below the apparatus, by raising the tray 192 the above-mentioned joining of the joint pipe 111 and the discharging opening 123 and the joining of the joint part 154 and the charging opening 136 are sealed and joined substantially automatically. Here also it is possible to provide the automatic valve mechanism described above.

The valve 193 of the inlet pipe 110 is opened, the solvent 17 inside the container 181 is supplied by the gear pump 195 through the inlet opening 110a to inside the reducing container 1 and the container 181 is emptied. Then, that the transferred solvent 17 has reached a predetermined quantity inside the reducing container 1 is detected by a liquid surface height sensor (for example, an ultrasonic or optical sensor) 154.

A temperature sensor 196 and a heater 190 are installed in the bottom part vicinity of the reducing container 1 and operate in conjunction to keep the supplied solvent 17 near room temperature at all times. In the case of a cold location it is also monitored by the above-mentioned liquid surface height detecting sensor 154, and the liquid surface height detecting sensor 154 also serves the purpose of concentration monitoring.

As shown in FIG. 39, the foam polystyrene 15 fed in through the feeding-in opening 152a is broken up by the stirring impellers 153 and the breaking-up assisting plates 151 inside the reducing container 1 as described above and at the same time is dissolved in the solvent 17 in the reducing container 1 and a solution 18 is produced.

The produced solution 18 is received into the again empty container 181 under its own weight by the valve 191 of the outlet opening 112 being opened. The container 181 is then removed from the dissolving apparatus 200 by the tray 192 being lowered and is carried to the recycling processing apparatus described above.

The liquid containers shown in FIG. 27A through FIG. 36 are attached to the kind of dissolving apparatus described above and deliver and receive liquids and are dedicated containers used for carrying liquids between a recycling processing apparatus and a dissolving apparatus.

Processing in the polystyrene recycling apparatus shown in FIG. 12 is carried out in the same way in this preferred embodiment also.

The method for carrying the solution 18 safely to a foam polystyrene recycling apparatus after removing the container holding the solution 18 from the dissolving apparatus 200, the structure of the container 13 and how the dissolving apparatus is used are the same as described above with reference to FIG. 6 through FIG. 16 and therefore a description thereof here will be omitted.

Also concerning results of experiments wherein the above-mentioned d-limonene and besides that isoamyl acetate, benzyl propionate and ethyl butyrate were used as solvents, the same results as those of Table 1 were shown.

With this preferred embodiment also, in a foam polystyrene dissolving and recycling system using a solvent, the above-mentioned benefits (1) through (5) can be obtained.

Figure 40:
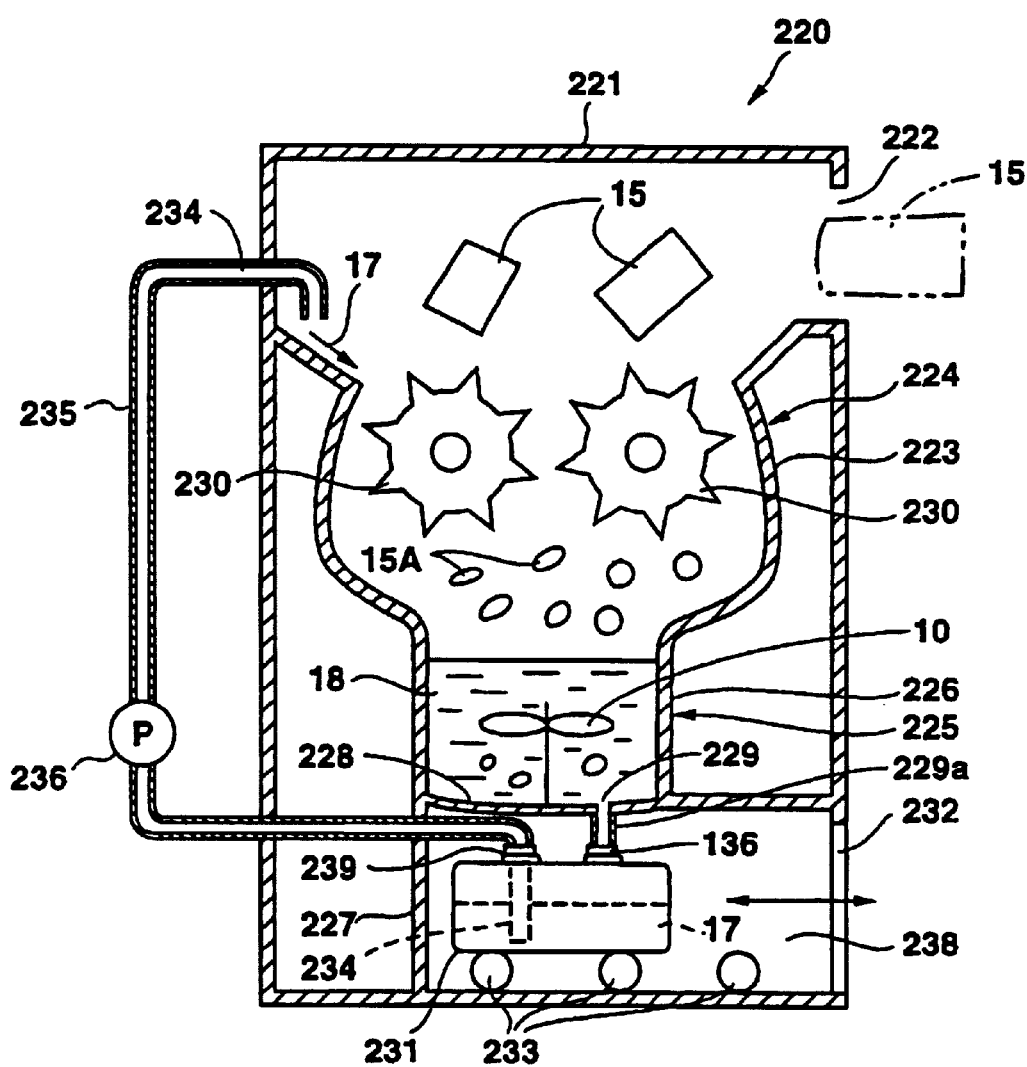
FIG. 40 is a sectional view of another dissolving apparatus with which a liquid container according to the fifth aspect of the invention can be used.

A liquid container of a preferred embodiment described above can also be used in the kind of foam polystyrene dissolving apparatus 220 shown in FIG. 40.

In this apparatus, an opening 122 for feeding in foam polystyrene is provided in an upper part of a housing 221, and a side wall 223 of a foam polystyrene breaking-up and dissolving part 224 is disposed below these. A lower side part 226 of the side wall 223 extends vertically downward and is constricted so that its cross-sectional area is narrower than the side wall 223 and forms a dissolving area 225, and a central part of a bottom wall 228 connected to a side wall lower side part 227 forms a solution outlet opening 229.

A pair of breaking-up wheels 230 are disposed in the upper part of the inside of the side wall 223 of the dissolving part 224, and are mutually oppositely rotated in the directions of the arrows by driving means not shown in the drawings. Also, a stirring impeller 10 is disposed inside the dissolving area 225 and is rotated by driving means not shown in the drawings.

A container loading part 238 is disposed below the bottom wall 228 of the lower side of the dissolving area 225, a container 231 is put in and taken out through an exit/entrance opening 232 and loaded on casters 233 disposed on the apparatus floor.

A solvent inlet opening 234 is provided in a side face of the housing 221 on the opposite side from the opening 222, an inlet pipe 235 with a pump 236 disposed therein is provided extending downward from this inlet opening 234 and the inlet pipe 235 is connected to the discharging opening 233 of the container 231.

As in the case of the dissolving apparatus 200 of FIG. 39 described above, first, a container 231 holding solvent 17 to be supplied to this apparatus 220 is loaded into the loading part 238, the pump 236 is driven and through the inlet pipe 235 the solvent 17 is supplied through the solvent inlet opening 234 into the breaking-up and dissolving part 224. The supplied solvent 17 naturally collects in the dissolving area.

Foam polystyrene 15 fed in through the opening in the housing 221 is broken up into small pieces by the breaking-up wheels 230 and as shown in the drawing becomes small pieces 15A and falls into the dissolving area 225, and while being stirred in the solvent 17 by the stirring impeller 10 is made into a solution 18.

A valve not shown in the drawing is opened and the solution thus produced passes through a solution outlet opening 229 and an outlet pipe 229a disposed downward therefrom and is received through the charging opening of the container 231 into the empty container 231. Thereafter the container 231 is taken out of the apparatus and carried to a recycling processing apparatus as described above.

Preferred embodiments of the invention are described above, but the invention is not limited to the preferred embodiments described above and various changes are possible on the basis of the technological concept of the invention.

For example, various constructions, shapes and materials of the dissolving apparatuses and containers described above may be employed. Nor are the structures of the various parts limited to the examples described above. The above-mentioned stirring impellers and breaking-up wheels are not always necessary. Also, the waste being dissolved and recycled may be made various types of waste other than foam polystyrene moldings.

Also, a liquid container according to the invention may be provided with two or more liquid inlet openings or two or more liquid discharging openings, and the shapes and positions of these openings can also be changed.

For example, the discharge pipe in the preferred embodiments shown in FIG. 27A through FIG. 40 was integrally formed with the container main body or was integrated therewith by mating using screw means to form the discharging opening, but a discharging opening projecting also to inside the main body itself may be provided and the discharge pipe may be mated with the discharging opening projecting inside the container. Also, the discharge pipe can be integrated with the main body with an adhesive or by welding instead of by screw means. The position and shape and orientation of the discharge pipe may also be changed.

Also, for the sealing method using an automatic valve mechanism or cap and the structure thereof of it is possible to employ various types other than the those of the preferred embodiments described above, and the positions of the charging opening and the discharging opening also can be other than in the upper face.

Also, the shape, positions and numbers of the projection and recess matings provided in the faces of the liquid container can be changed freely and it is also possible to change the shape of the handle to another shape and make it double as concavity-convexity mating means.

It is possible to dissolve waste consisting of foam polystyrene using as a solvent at least one solvent chosen from a group consisting of an aromatic organic solvent, a hydrocarbon organic solvent, an ether organic solvent, an ester organic solvent, a ketone organic solvent and a monoterpene organic solvent. Preferable among these, besides the limonene mentioned above, are isoamyl acetate, benzyl propionate and ethyl butyrate.

Also, the containers of the preferred embodiments described above, besides for a discarded foam polystyrene dissolving and recycling system, can also be suitably used in a system wherein for example acidic articles are neutralized with alcohol to produce an ester and reversely alcohol is separated from the ester.

In this case, processing of waste other than dissolving and recycling, for example treating acid as waste with a supply of alcohol and thereby changing it into an ester, is also possible.

In the first through third aspects of the invention, as described above, because a storing part for storing produced liquid produced in a processing part for processing supplied waste with a processing liquid is removably provided with a liquid container for receiving the produced liquid is removably provided and the liquid container is constructed to receive the processing liquid and supply this processing liquid to the processing part before receiving the produced liquid, it is possible to design with the capacity of one processing as a maximum value and make common the transportation container of the unused processing liquid and the transportation container of the produced liquid and waste processing can be carried out easily and efficiently.

Because it is possible to carry out concentration control easily one batch at a time and discharge a solution directly into a dedicated transportable container with the concentration of the solution kept at a predetermined fixed concentration at all times, processing at a recycling plant is made easy.

Because a container based on the fourth aspect of the invention, as described above, is removably attachable to a storing part for storing produced liquid produced in a processing part for processing supplied waste with a processing liquid and constructed to receive the processing liquid and supply this processing liquid to the processing part before receiving the produced liquid and a first opening for receiving the produced liquid from the processing part provided in a top part of a main body is made wider than a second opening for discharging liquid (particularly the produced liquid after the processing) provided in a bottom part of the main body, these openings can be respectively selectively used for discharging and charging of liquids and when carrying out discharging and charging of liquid there is no need for rotating or swinging around of pipes or hoses accompanying interchanging of pipes or hoses and a small space is sufficient.

Also, passing the end of a solution discharge pipe or the like into the large first opening becomes easy, and because by making the solution discharge pipe large in diameter it is possible to transfer even a highly viscous liquid in a short time the efficiency of the transfer operation is improved.

Also, in cases where to supply the liquid it is sucked out with a pump, when the solution is fed out through the second opening provided in the bottom face of the container it is possible to utilize a discharging action due to the weight of the liquid itself and the power consumed for driving the pump is also reduced.

Also, it is possible to design this container with the capacity of one processing as a maximum value and make a container for transporting unused processing liquid and a container for transporting produced liquid common and waste processing can thereby be carried out efficiently, and furthermore because concentration control can be carried out simply and reliably on the basis of processing liquid supplying, operations and produced liquid receiving operations being carried out in one-to-one correspondence using the same dedicated liquid container a liquid of a fixed predetermined concentration can be received at all times and processing at a recycling plant is thereby facilitated.

Also, according to the fifth aspect of the invention, because as described above a liquid container comprises a container main body having a liquid charging opening and a liquid discharging opening and a liquid discharging pipe part provided integrally with the container main body and extending from the discharging opening to the vicinity of an inside bottom surface of the container main body, it is not necessary to insert a strainer pipe when discharging liquid and the discharging operation is easy and the liquid container can easily adapt to automation and system rationalization becomes possible.

Thus, the first through fifth aspects of the invention provide the following clear benefits:

(1) Transferring liquids to and from the apparatus is easy.
(2) Transport systems of both new and old liquids can be operated using a single container.
(3) Compatibility of apparatuses and containers designed with the same specifications can be provided.
(4) The safety of operation of the system is increased.
(5) It is possible to provide a dissolving apparatus which can be easily installed and used even in a shop or a home. Also, only the liquid container needs to be carried.

What is claimed is:

1. A liquid container used in a waste processing apparatus having a processing part for processing supplied waste with a processing liquid and a storing part for storing produced liquid produced in said processing part, which liquid container is for receiving said produced liquid and is removably attachable to said storing part and receives said processing liquid and supplies said processing liquid to said processing part before receiving said produced liquid and is carried from said waste processing apparatus to a waste recycling apparatus after receiving said produced liquid and carried from said waste recycling apparatus to said waste processing apparatus after receiving new processing liquid.

2. A liquid container according to claim 1, which liquid container is used in a waste processing apparatus wherein said processing part is a waste dissolving part for dissolving waste with a solvent and said storing part stores waste solution produced in said waste dissolving part.

3. A liquid container according to claim 2, which liquid container is fitted to said storing part after being fitted to an upper part of said waste dissolving part and supplying solvent to said waste dissolving part.

4. A liquid container according to claim 2, which liquid container has pumping means for transferring said solvent from said storing part to said waste dissolving part detachably attached thereto while holding solvent and fitted to said storing part.

5. A liquid container according to claim 2, which liquid container has an internal volume corresponding to an amount of waste solution produced in said waste dissolving part and holds solvent at a level below a waste solvent holding level at which it holds waste solvent.

6. A liquid container according to claim 2, which liquid container is used in a waste processing apparatus dissolving waste consisting of foam polystyrene using at least one solvent chosen from a group consisting of an aromatic organic solvent, a hydrocarbon organic solvent, an ether organic solvent, an ester organic solvent, a ketone organic solvent and a monoterpene organic solvent.

7. A liquid container according to claim 6, which liquid container is used in a waste processing apparatus using at least one solvent chosen from the group consisting of limonene, isoamyl acetate, benzyl propionate and ethyl butyrate.

8. A liquid container used in a waste processing apparatus having a processing part for processing supplied waste with a processing liquid and a storing part for storing produced liquid produced in said processing part, which liquid container is for receiving said produced liquid and is removably attachable to said storing part and receives said processing liquid and supplies said processing liquid to said processing part before receiving said produced liquid and is carried from said waste processing apparatus to a waste recycling apparatus after receiving said produced liquid and carried from said waste recycling apparatus to said waste processing apparatus after receiving new processing liquid and has at least one first opening for receiving said produced liquid from said processing part after said processing provided in an upper part of a container main body and at least one second opening for discharging liquid provided in a lower part of said container main body, said first opening being wider than said second opening.

9. A liquid container according to claim 8, which liquid container is used in a waste processing apparatus wherein said processing part is a waste dissolving part for dissolving waste with a solvent as said processing liquid and said storing part stores waste solution produced in said waste dissolving part.

10. A liquid container according to claim 9, which liquid container is fitted to said storing part after being fitted to an upper part of said waste dissolving part and supplying solvent to said waste dissolving part.

11. A liquid container according to claim 9, which liquid container has pumping means for transferring said solvent from said storing part to said waste dissolving part detachably attached thereto while holding solvent and fitted to said storing part.

12. A liquid container according to claim 8, wherein automatic opening and closing means which opens when pressurized and closes when not pressurized is disposed in said second opening.

13. A liquid container according to claim 12, wherein said automatic opening and closing means is a pressure-operated opening and closing valve.

14. A liquid container according to claim 9, which liquid container has an internal volume corresponding to an amount of waste solution produced in said waste dissolving part and holds solvent at a level below a waste solvent holding level at which it holds waste solvent.

15. A liquid container according to claim 9, which liquid container is used in a waste processing apparatus dissolving waste consisting of foam polystyrene using at least one solvent chosen from a group consisting of an aromatic organic solvent, a hydrocarbon organic solvent, an ether organic solvent, an ester organic solvent, a ketone organic solvent and a monoterpene organic solvent.

16. A liquid container according to claim 15, which liquid container is used in a waste processing apparatus using at least one solvent chosen from the group consisting of limonene, isoamyl acetate, benzyl propionate and ethyl butyrate.

17. A liquid container comprising a container main body having a liquid charging opening and a liquid discharging opening and a liquid discharging pipe part provided integrally with said container main body and extending from said discharging opening to the vicinity of an inside bottom surface of said container main body, which liquid container is a carryable liquid container removably attachable to a processing apparatus and carried to said processing apparatus after receiving a processing liquid into said container main body through said liquid charging opening and charges said processing liquid into said processing apparatus and receives produced liquid produced by a predetermined material processing through said liquid charging opening and while holding said produced liquid is removed from said processing apparatus and carried.

18. A liquid container according to claim 17, which liquid container receives a solvent as said processing liquid and supplies said solvent to a waste processing apparatus and receives and carries a solution produced by dissolving waste with said solvent.

19. A liquid container according to claim 18, wherein said waste processing apparatus has waste breaking-up means and a waste dissolving part and said liquid charging opening of said liquid container is connected to said waste dissolving part.

20. A liquid container according to claim 19, which liquid container directly charges processing liquid into said waste dissolving part through said liquid discharging opening.

21. A liquid container according to claim 18, which liquid container is so constructed that said processing liquid can be directly charged into said waste dissolving part through said liquid discharging opening by pumping means.

22. A liquid container according to claim 18, which liquid container is carried to a recycling processing part while holding a liquid and discharges said liquid before being carried to said processing apparatus while holding said processing liquid.

23. A liquid container according to claim 18, which liquid container is used in a waste processing apparatus dissolving waste consisting of foam polystyrene using at least one solvent chosen from a group consisting of an aromatic organic solvent, a hydrocarbon organic solvent, an ether organic solvent, an ester organic solvent, a ketone organic solvent and a monoterpene organic solvent.

24. A liquid container according to claim 23, which liquid container is used in a waste processing apparatus using at least one solvent chosen from the group consisting of limonene, isoamyl acetate, benzyl propionate and ethyl butyrate.

* * * * *